US011930375B2

(12) United States Patent
Zhu et al.

(10) Patent No.: US 11,930,375 B2
(45) Date of Patent: Mar. 12, 2024

(54) TECHNIQUES FOR BEAM MANAGEMENT

(71) Applicant: QUALCOMM Incorporated, San Diego, CA (US)

(72) Inventors: Jun Zhu, San Diego, CA (US); Yongle Wu, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/453,552

(22) Filed: Nov. 4, 2021

(65) Prior Publication Data
US 2022/0174508 A1 Jun. 2, 2022

Related U.S. Application Data

(60) Provisional application No. 63/118,786, filed on Nov. 27, 2020.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 24/10* (2013.01); *H04W 36/08* (2013.01)

(58) Field of Classification Search
CPC ..... H04W 16/28; H04W 24/10; H04W 36/08; H04B 7/0695; H04B 7/088
See application file for complete search history.

(56) References Cited

U.S. PATENT DOCUMENTS

2019/0132778 A1* 5/2019 Park .................. H04W 36/30
2019/0297648 A1* 9/2019 Nagaraja .............. H04B 7/063
(Continued)

FOREIGN PATENT DOCUMENTS

| WO | 2017099830 A1 | 6/2017 | |
| WO | WO-2017099830 A1 * | 6/2017 | ........... H04B 7/0617 |
| WO | WO-2018137652 A1 * | 8/2018 | ........... H04W 36/00 |

OTHER PUBLICATIONS

International Search Report and Written Opinion—PCT/US2021/072264—ISA/EPO—dated Mar. 1, 2022.

*Primary Examiner* — Deepa Belur
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may measure a signal, transmitted by a base station, using a set of candidate beams. The UE may communicate, with the base station based at least in part on the measurement of the signal, using a first beam from the set of candidate beams. The UE may determine to switch the first beam based on a first value for a beam parameter associated with a second beam, from the set of candidate beams, satisfying a condition. The UE may measure, based at least in part on the determination to switch the first beam, the second beam to obtain a second value of the beam parameter. The UE may switch the first beam to the second beam if the second value satisfies a condition. Numerous other aspects are provided.

30 Claims, 10 Drawing Sheets

(51) Int. Cl.
*H04W 24/10* (2009.01)
*H04W 36/08* (2009.01)

(56) References Cited

U.S. PATENT DOCUMENTS

2019/0312628 A1* 10/2019 Bergström ........... H04B 7/0617
2020/0244413 A1* 7/2020 Takeda .................... H04B 7/10
2021/0092625 A1* 3/2021 Wang ................... H04L 5/0057

* cited by examiner

TECHNIQUES FOR BEAM MANAGEMENT

CROSS-REFERENCE TO RELATED APPLICATION

This patent application claims priority to U.S. Provisional Patent Application No. 63/118,786, filed on Nov. 27, 2020, entitled "TECHNIQUES FOR BEAM MANAGEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes measuring a signal, transmitted by a base station, using a set of candidate beams; communicating, with the base station based at least in part on the measurement of the signal, using a first beam from the set of candidate beams; determining to switch the first beam based at least in part on a first value for a beam parameter associated with a second beam, from the set of candidate beams, satisfying a condition; measuring, based at least in part on the determination to switch the first beam, the second beam to obtain a second value of the beam parameter; and switching the first beam to the second beam if the second value of the beam parameter satisfies the condition.

In some aspects, a UE for wireless communication includes a memory and one or more processors coupled to the memory. The one or more processors may be configured to: measure a signal, transmitted by a base station, using a set of candidate beams; communicate, with the base station based at least in part on the measurement of the signal, using a first beam from the set of candidate beams; determine to switch the first beam based at least in part on a first value for a beam parameter associated with a second beam, from the set of candidate beams, satisfying a condition; measure, based at least in part on the determination to switch the first beam, the second beam to obtain a second value of the beam parameter; and switch the first beam to the second beam if the second value of the beam parameter satisfies the condition.

In some aspects, a non-transitory computer-readable medium storing a set of instructions for wireless communication includes one or more instructions that, when executed by one or more processors of a UE, cause the UE to: measure a signal, transmitted by a base station, using a set of candidate beams; communicate, with the base station based at least in part on the measurement of the signal, using a first beam from the set of candidate beams; determine to switch the first beam based at least in part on a first value for a beam parameter associated with a second beam, from the set of candidate beams, satisfying a condition; measure, based at least in part on the determination to switch the first beam, the second beam to obtain a second value of the beam parameter; and switch the first beam to the second beam if the second value of the beam parameter satisfies the condition.

In some aspects, an apparatus for wireless communication includes means for measuring a signal, transmitted by a base station, using a set of candidate beams; means for communicating, with the base station based at least in part on the measurement of the signal, using a first beam from the set of candidate beams; means for determining to switch the first beam based at least in part on a first value for a beam parameter associated with a second beam, from the set of candidate beams, satisfying a condition; means for measuring, based at least in part on the determination to switch the first beam, the second beam to obtain a second value of the beam parameter; and means for switching the first beam to the second beam if the second value of the beam parameter satisfies the condition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
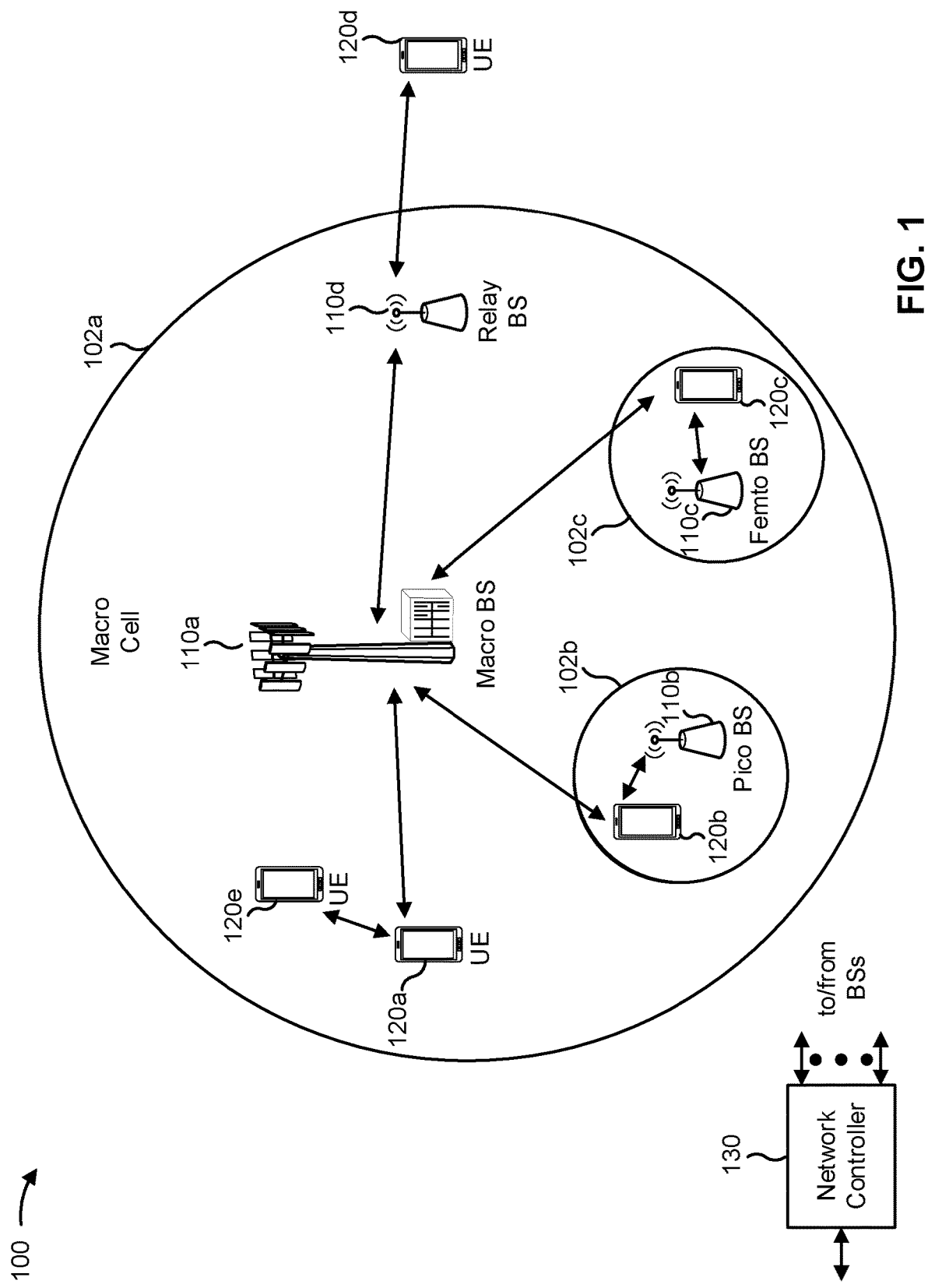
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
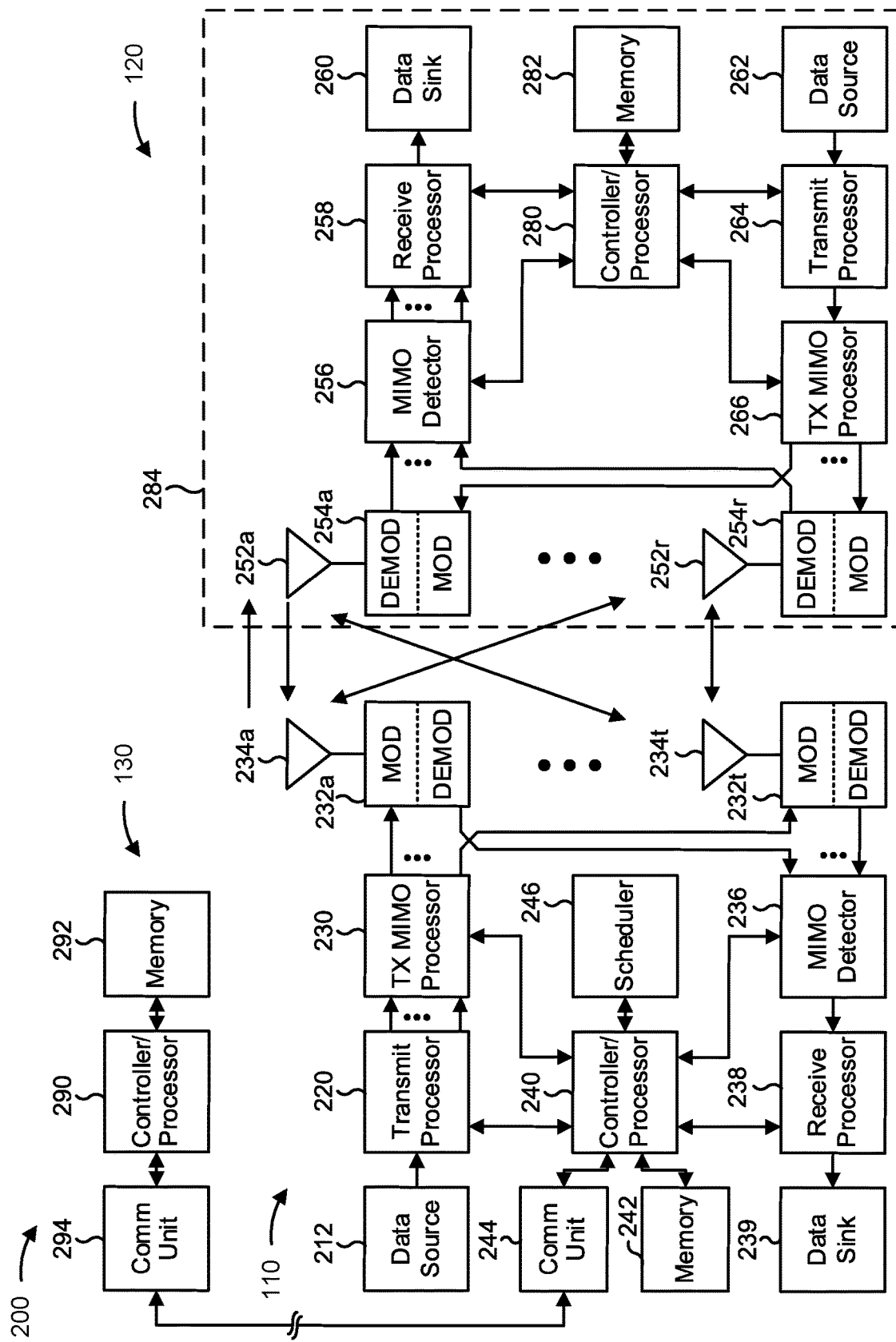
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with beam management, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions.

In some aspects, the UE 120 includes means for measuring a signal, transmitted by a base station, using a set of candidate beams; means for communicating, with the base station based at least in part on the measurement of the signal, using a first beam from the set of candidate beams; means for determining to switch the first beam based at least in part on a first value for a beam parameter associated with a second beam, from the set of candidate beams, satisfying a condition; means for measuring, based at least in part on the determination to switch the first beam, the second beam to obtain a second value of the beam parameter; and/or means for switching the first beam to the second beam if the second value of the beam parameter satisfies the condition. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for measuring the first beam in accordance with a periodic schedule.

In some aspects, the UE 120 includes means for determining a value of the beam parameter for each candidate beam included in the set of candidate beams based at least in part on the measurement of the signal using the set of candidate beams; or means for selecting, from the set of candidate beams, the first beam based at least in part on the value of the beam parameter for each candidate beam included in the set of candidate beams.

In some aspects, the UE 120 includes means for determining that the condition is satisfied for switching the first beam to the second beam (e.g., based at least in part on the first value and a value of the beam parameter associated with the first beam, where the first value and the value are obtained based at least in part on the measurement of the signal).

In some aspects, the UE 120 includes means for determining, based at least in part on the measurement of the second beam, that the condition remains satisfied; or means for switching the first beam to the second beam based at least in part on the determination that the condition remains satisfied.

In some aspects, the UE 120 includes means for determining, based at least in part on the measurement of the second beam, that the condition is no longer satisfied; or means for refraining from switching the first beam to the second beam based at least in part on the determination that the condition is no longer satisfied.

In some aspects, the UE 120 includes means for identifying a stored value of the beam parameter for the second beam; or means for determining, based at least in part on a comparison of the stored value of the beam parameter for the second beam to a value of the beam parameter for the first beam, that the condition is satisfied.

In some aspects, the UE 120 includes means for transmitting a measurement report that is based at least in part on values of a beam parameter for one or more serving beams associated with the UE, wherein the first beam is included in the one or more serving beams.

In some aspects, the UE 120 includes means for ranking, based at least in part on values of the beam parameter for the one or more serving beams, the one or more serving beams; or means for selecting, based at least in part on the ranking of the one or more serving beams, a set of serving beams to be included in the measurement report, means for transmitting the measurement report indicating values of the beam parameter for the set of serving beams.

In some aspects, the UE 120 includes means for ranking, based at least in part on values of the beam parameter for one or more serving beams, the one or more serving beams; means for selecting, based at least in part on the ranking of the one or more serving beams, a set of serving beams associated with a cell; or means for determining an average value of the beam parameter for the cell based at least in part on values of the beam parameter for the set of serving beams associated with the cell, means for transmitting the measurement report indicating the average value of the beam parameter for the cell.

In some aspects, the UE 120 includes means for receiving, from the base station, an indication to switch a serving transmit beam associated with the base station to a different transmit beam based at least in part on transmitting a measurement report; or means for switching, for the base station, the serving transmit beam associated with the base station to the different transmit beam.

In some aspects, the UE 120 includes means for receiving, from the base station, a handover command indicating that the UE is to switch a serving cell of the UE to a different cell based at least in part on transmitting a measurement report; or means for performing a handover from the serving cell to the different cell based at least in part on receiving the handover command.

As indicated above, FIG. 2 is provided as an example. Other examples may differ from what is described with regard to FIG. 2.

Figure 3:
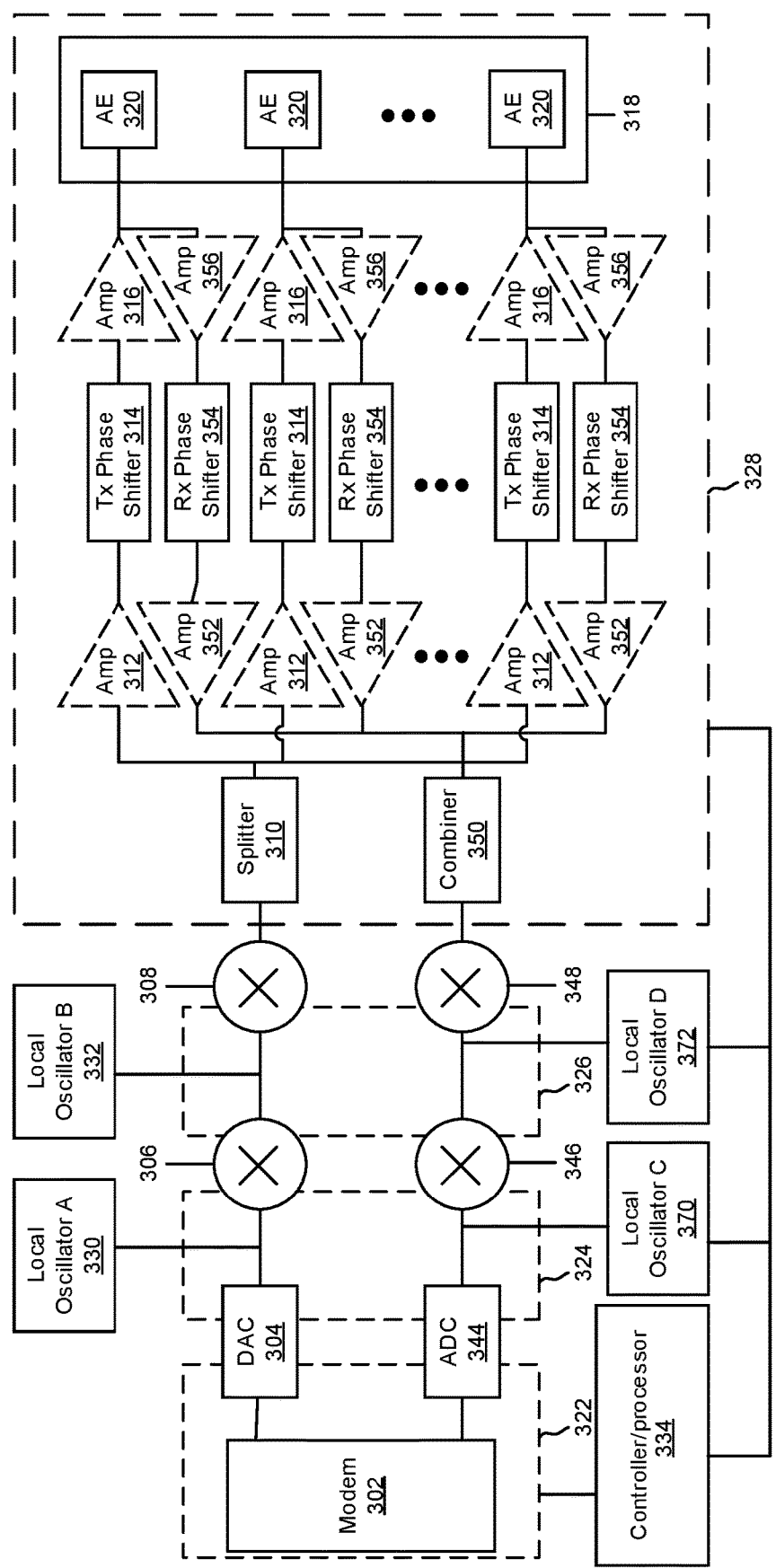
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two-dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifiers 312 and second amplifiers 316 are present. In some aspects, neither the first amplifier 312 nor the second amplifier 316 is present. In some aspects, one of the amplifiers 312 or amplifier 316 is present but not the other. By way of example, if the splitter 310 is an active splitter, the first amplifiers 312 may not be used. By way of further example, if the phase shifter 314 is an active phase shifter that can provide a gain, the second amplifiers 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease the amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally downconvert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
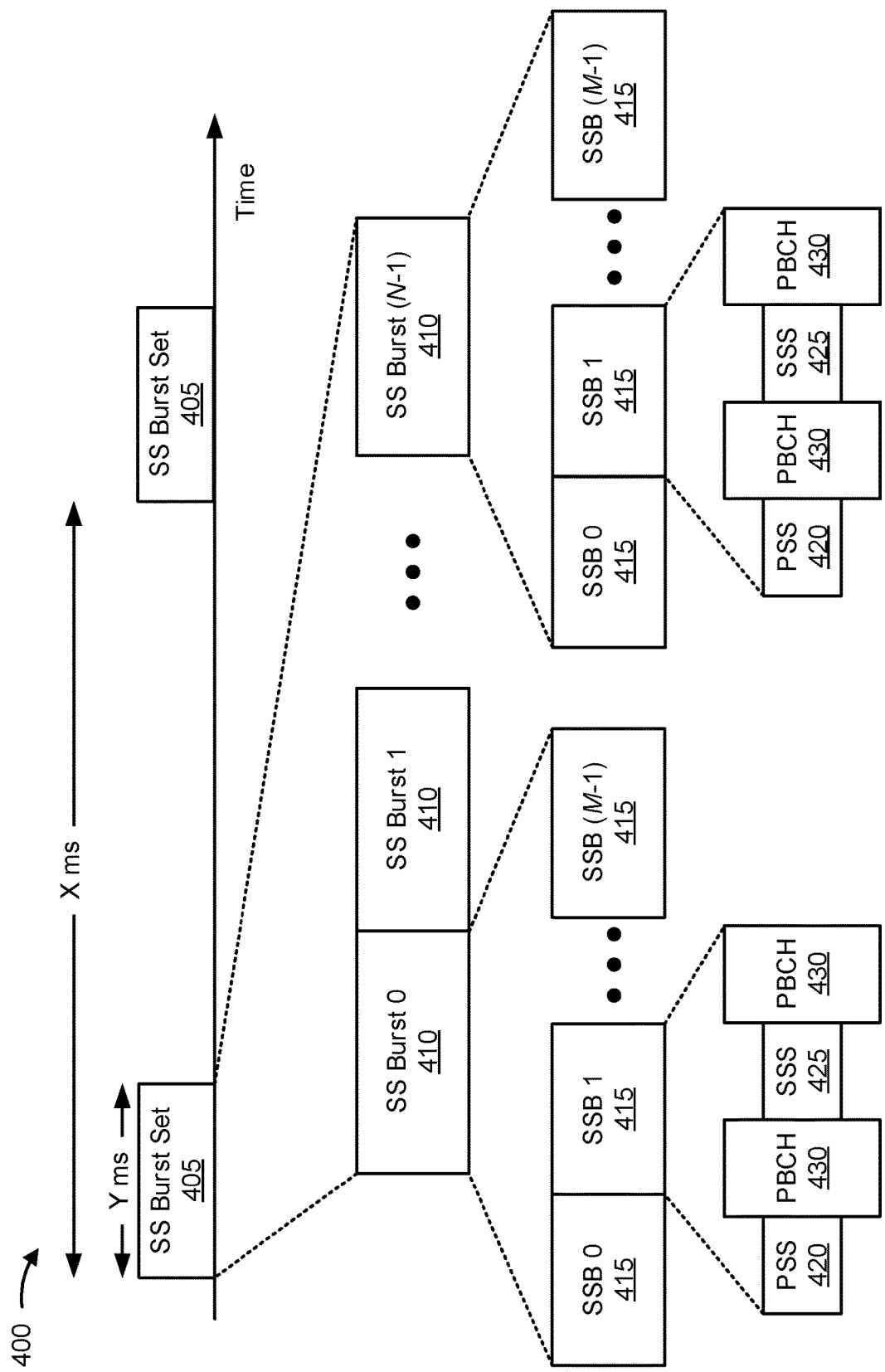
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, beam selection, and/or the like (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a PSS 420, an SSS 425, a physical broadcast channel (PBCH) 430, and/or the like. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
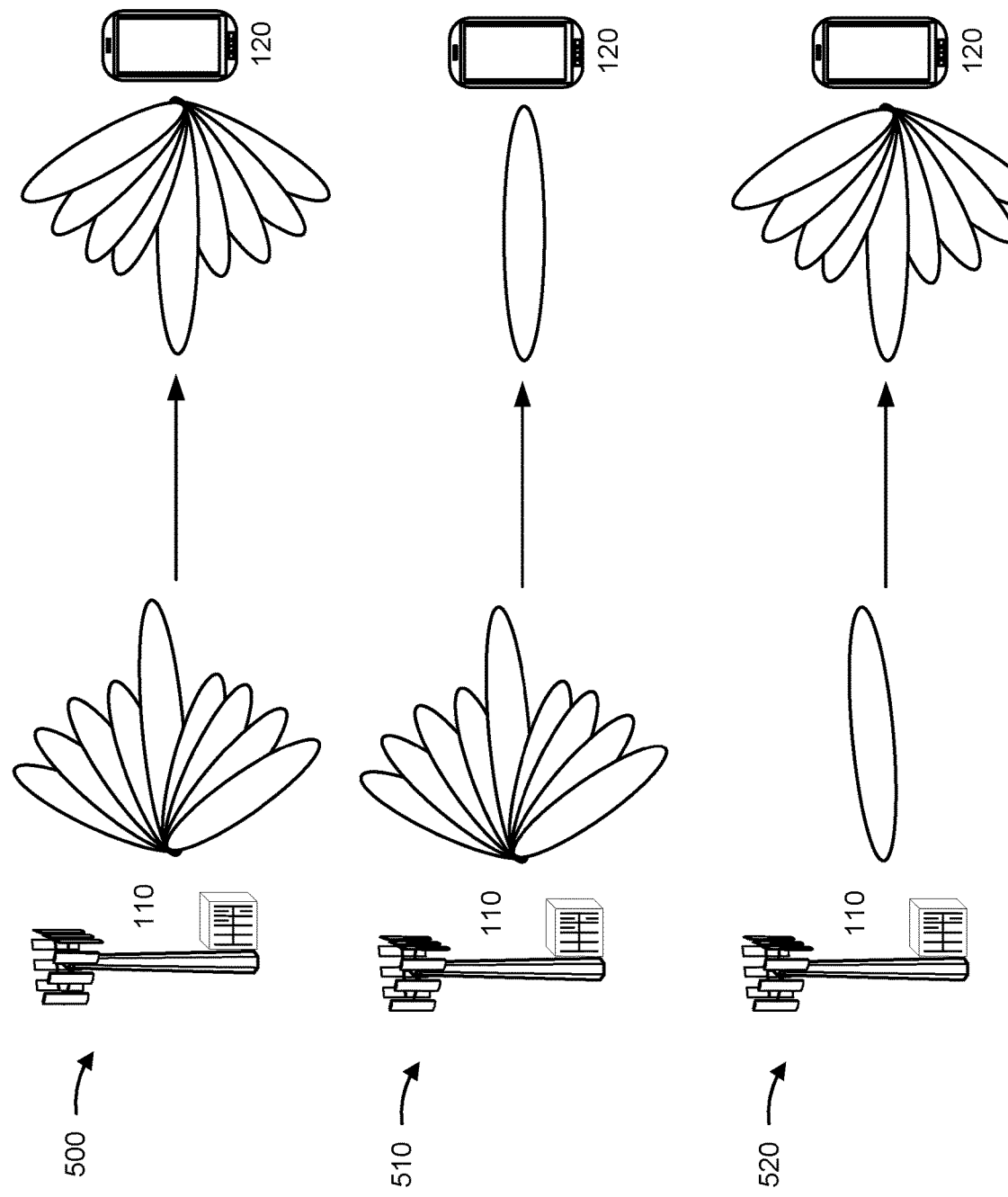
FIGS. 5 and 6 are diagrams illustrating examples of beam management procedures, in accordance with the present disclosure.

FIG. 5 is a diagram illustrating examples 500, 510, and 520 of beam management procedures, in accordance with the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 5, example 500 may include a base station 110 and a UE 120 communicating to perform beam management using reference signals (e.g., SSBs or channel state information reference signals (CSI-RSs)). Example 500 depicts a first beam management procedure (such as a P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 5 and example 500, reference signals may be configured to be transmitted from the base station 110 to the UE 120. The reference signals may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. A transmit beam may be a beam or transmission configuration indicator (TCI) state that is used by a wireless communication device (e.g., a base station 110 or a UE 120) for transmitting signals. For example, the base station 110 may transmit a reference signal using each transmit beam associated with the base station 110 for beam management. To enable the UE 120 to perform receive (Rx) beam sweeping (e.g., a receive beam may be a beam, a TCI state, and/or spatial relation information that is used by a wireless communication device (e.g., a base station 110 or a UE 120) for receiving signals), the base station 110 may use a transmit beam to transmit (e.g., with repetitions) each reference signal at multiple times within the same resource set so that the UE 120 can sweep through receive beams in multiple transmission instances. For example, if the base station 110 has a set of N transmit beams and the UE 120 has a set of M receive beams, then the reference signal may be transmitted on each of the N transmit beams M times so that the UE 120 may receive M instances of the reference signals per transmit beam. In other words, for each transmit beam of the base station 110, the UE 120 may perform beam sweeping through the receive beams of the UE 120. As a result, the first beam management procedure may enable the UE 120 to measure a reference signal on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120.

As shown in FIG. 5, example 510 may include a base station 110 and a UE 120 communicating to perform beam management using reference signals. Example 510 depicts a second beam management procedure (such as a P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 5 and example 510, reference signals may be configured to be transmitted from the base station 110 to the UE 120. The reference signals may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a reference signal using each transmit beam of the one or more transmit beams for beam management. The UE 120 may measure each reference signals using a single (e.g., a same) receive beam (e.g., determined based at least in part on measurements performed in connection with the first beam management procedure). The second beam management procedure may enable the base station 110 to select a best transmit beam based at least in part on measurements of the reference signals (e.g., measured by the UE 120 using the single receive beam) reported by the UE 120.

As shown in FIG. 5, example 520 depicts a third beam management procedure (such as a P3 CSI-RS beam management). The third beam management procedure may be referred to as a beam refinement procedure, a UE beam refinement procedure, a receive beam refinement procedure, and/or the like. As shown in FIG. 5 and example 520, one or more reference signals may be configured to be transmitted from the base station 110 to the UE 120. The reference signals may be configured to be aperiodic (e.g., using DCI and/or the like). The third beam management process may include the base station 110 transmitting the one or more reference signals using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) reference signals at multiple times within the same resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the reference signal of the transmit beam using the one or more receive beams).

As indicated above, FIG. 5 is provided as an example of beam management procedures. Other examples of beam management procedures may differ from what is described with respect to FIG. 5. For example, the UE 120 and the base station 110 may perform the third beam management procedure before performing the second beam management procedure, the UE 120 and the base station 110 may perform a similar beam management procedure to select a UE transmit beam, and/or the like.

Figure 6:
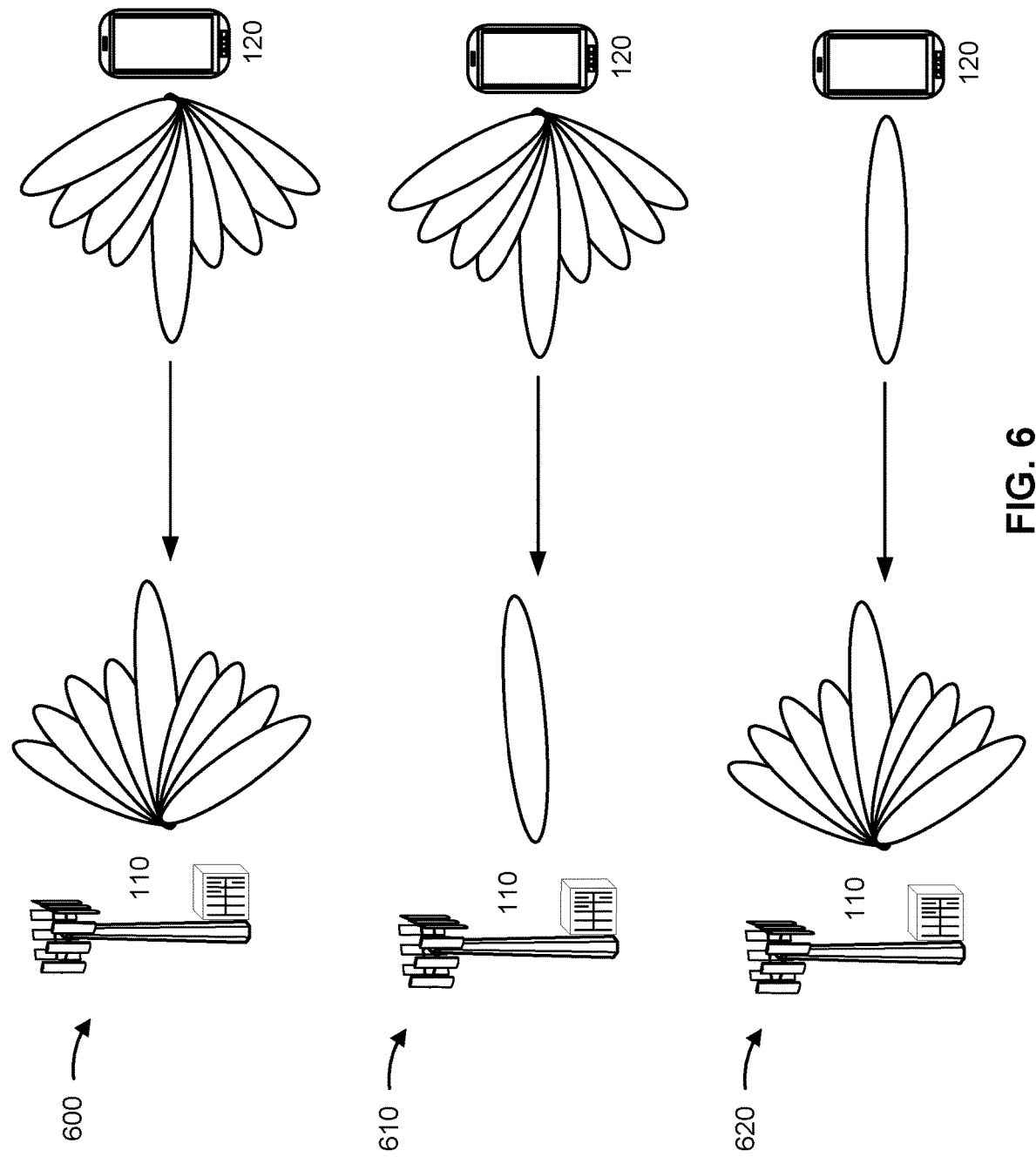

FIG. 6 is a diagram illustrating examples 600, 610, and 620 of beam management procedures, in accordance with the present disclosure. As shown in FIG. 6, examples 600, 610, and 620 include a UE in communication with a base station in a wireless network (e.g., wireless network 100). However, the devices shown in FIG. 6 are provided as examples, and the wireless network may support communication and beam management between other devices (e.g., between a UE and a base station or TRP, between a mobile termination node and a control node, between an IAB child node and an IAB parent node, and/or between a scheduled node and a scheduling node, among other examples). In some aspects, the UE and the base station may be in a connected state (e.g., an RRC connected state, among other examples).

As shown in FIG. 6, example 600 may include a base station and a UE communicating to perform beam management using reference signals, such as sounding reference signals (SRSs). Example 600 depicts a first beam management procedure (e.g., U1 beam management). The first beam management procedure may be referred to as a beam selection procedure, an initial beam acquisition procedure, a beam sweeping procedure, a beam search procedure, and/or the like. As shown in FIG. 6 and example 600, SRSs may be configured to be transmitted from the UE to the base station. The SRSs may be configured to be periodic (e.g., using RRC signaling and/or the like), semi-persistent (e.g., using MAC-CE signaling and/or the like), and/or aperiodic (e.g., using DCI and/or the like).

The first beam management procedure may include the UE performing beam sweeping over multiple Tx beams. The UE may transmit an SRS using each transmit beam for beam management. To enable the base station to perform Rx beam sweeping, the UE may use a transmit beam to transmit (e.g., with repetitions) each SRS at multiple times within the same reference signal (RS) resource set so that the base station can sweep through receive beams in multiple transmission instances. For example, if the UE has a set of N transmit beams and the base station has a set of M receive beams, the SRS may be transmitted on each of the N transmit beams M times so that the base station may receive M instances of the SRS per transmit beam. In other words, for each transmit beam of the UE, the base station may perform beam sweeping through the receive beams of the base station. As a result, the first beam management procedure may enable the base station to measure an SRS on different transmit beams using different receive beams to support selection of UE transmit beams/base station receive beam(s) beam pair(s). The base station may select one or more beam pair(s) for communication between the base station and the UE. While example 600 has been described in connection with SRSs, the first beam management process may also use other types of reference signals for beam management in a similar manner as described above.

As shown in FIG. 6, example 610 may include a base station and a UE communicating to perform beam management using SRSs. Example 610 depicts a second beam management procedure (e.g., U2 beam management). The second beam management procedure may be referred to as a beam refinement procedure, a beam refinement procedure, a transmit beam refinement procedure, and/or the like. As shown in FIG. 6 and example 610, SRSs may be configured to be transmitted from the UE to the base station. The SRSs may be configured to be aperiodic (e.g., using DCI and/or the like). The second beam management procedure may include the UE performing beam sweeping over one or more transmit beams. The one or more transmit beams may be a subset of all transmit beams associated with the UE (e.g., determined based at least in part on measurements reported by the base station in connection with the first beam management procedure). The subset of all transmit beams may be relatively narrow beams compared to transmit beams used in the first beam management procedure.

The UE may transmit an SRS using each transmit beam of the one or more transmit beams for beam management. The base station may measure each SRS using a single (e.g., a same) receive beam (e.g., determined based at least in part on measurements performed in connection with the first beam management procedure). The second beam management procedure may enable the UE to select a best transmit beam based at least in part on measurements of the SRSs (e.g., measured by the base station using the single receive beam) reported by the base station.

As shown in FIG. 6, example 620 depicts a third beam management procedure (e.g., U3 beam management). The third beam management procedure may be referred to as a beam refinement procedure, a base station beam refinement procedure, a receive beam refinement procedure, and/or the like. As shown in FIG. 6 and example 620, one or more SRSs may be configured to be transmitted from the UE to the base station. The SRSs may be configured to be aperiodic (e.g., using DCI and/or the like). The third beam management process may include the UE transmitting the one or more SRSs using a single transmit beam (e.g., determined based at least in part on measurements reported by the base station in connection with the first beam management procedure and/or the second beam management procedure). The single transmit beam may be a relatively narrow beam compared to transmit beams used in the first beam management procedure.

To enable the base station to perform receive beam sweeping, the UE may use a transmit beam to transmit (e.g., with repetitions) SRS at multiple times within the same RS resource set so that base station can sweep through one or more receive beams in multiple transmission instances. The one or more receive beams may be a subset of all receive beams associated with the base station (e.g., determined based at least in part on measurements performed in connection with the first beam management procedure and/or the second beam management procedure). The third beam management procedure may enable the base station to select a best receive beam based at least in part on measurements of the SRSs of the transmit beam using the one or more receive beams.

As indicated above, FIG. 6 is provided as an example of beam management procedures. Other examples of beam management procedures may differ from what is described with respect to FIG. 6. For example, the UE and the base station may perform the third beam management procedure before performing the second beam management procedure, among other examples.

Some wireless networks, such as millimeter wave wireless networks, may be beamformed systems in that wireless communication devices within the wireless network may communicate using beams. For example, a base station 110 and a UE 120 may communicate using an uplink beam, a downlink beam, and/or a beam pair (e.g., a transmit beam of a transmitter and a receive beam of a receiver). For example, for downlink communications, a base station 110 and a UE 120 may communicate using a downlink beam or beam pair that includes a base station transmit beam and a UE receive beam. Similarly, for uplink communications, a base station 110 and a UE 120 may communicate using an uplink beam or a beam pair that includes a base station receive beam and a UE transmit beam. In some aspects, a beam pair may be used for both uplink and downlink communications (e.g., the base station transmit beam and receive beam in the examples described above may be the same beam).

As described above, a UE 120 and a base station 110 may perform a beam management procedure (e.g., a beam management procedure described in connection with FIGS. 5 and/or 6) to identify a beam or beam pair for communications between the UE 120 and the base station 110. For example, the UE 120 may measure signals transmitted by the base station 110 (e.g., using a set of transmit beams) using a set of candidate receive beams at different occasions to identify a best beam or beam pair for communications (e.g., based on a beam parameter, such as RSRP, signal-to-noise ratio (SNR), a cell selection criteria parameter (e.g., an S criteria parameter), and/or RSRQ, among other examples). Similarly, for uplink communications, the UE 120 may perform a beam management procedure (e.g., a beam management procedure described in connection with FIG. 6) to identify a beam or beam pair for uplink communications.

The UE 120 may measure different transmit beams and receive beams, as described above, and may store the values of a beam parameter for the different beams (e.g., RSRP for downlink or a maximum transmit power of the UE (e.g., Pmax) for uplink). The UE 120 may select a serving beam (e.g., a beam that is used by the UE 120 to transmit and/or receive communications) based on the measurements. Similarly, the UE 120 may transmit measurement reports (e.g., Layer 1 (L1) beam measurement reports and/or Layer 3 (L3) cell measurement reports) to the base station 110 using the stored values described above. The measurement reports may enable the base station 110 to make beam management and/or cell management decisions.

The UE 120 may maintain (e.g., store) values of the beam parameter for different beams (e.g., in a modem of the UE 120). This is important in high mobility or fading environments in which the UE 120 may need to switch beams due to interruptions on a selected serving beam or beam pair. For example, in some aspects, the UE 120 may update or switch the serving beam of the UE 120 if the UE 120 determines a different beam has a better beam parameter value (e.g., a better RSRP value or a better Pmax value). For example, a beam may become blocked, such as when an obstruction interrupts a propagation path of the beam. Beam blocking may result in an abrupt decrease (e.g., below a threshold, such as a noise floor) in the useful signal strength received for the beam and/or one or more adjacent beams in a beam set that includes the beam. This degradation in signal strength may occur across the entire system bandwidth on those beams (e.g., rather than being isolated to one or more frequencies) for a duration of time. The degradation in signal strength may result in communication errors, such as dropped communications, failed reception, failed demodulation, and/or failed decoding, among other examples.

In some examples, when the UE 120 detects that a signal strength of the serving beam decreases, the UE 120 may determine to update or switch the serving beam of the UE 120 if the UE 120 determines a different beam has a better beam parameter value (e.g., using the stored values as described above). In some examples, the UE 120 may autonomously update or switch the serving beam of the UE 120 (e.g., without notifying the base station 110). For example, for downlink communications, if the UE 120 determines that a signal strength of a serving beam of the UE 120 decreases, then the UE 120 may switch to a different serving beam (e.g., a different receive beam) based at least in part on stored values of the beam parameter of different beams previously performed by the UE 120 (e.g., as described above). The UE 120 may receive communications from the base station 110 (transmitted using the same transmit beam of the base station 110) using the new or updated serving beam of the UE 120 (e.g., using a new or updated receive beam).

However, in some cases, the serving beam of the base station 110 may become blocked. The UE 120 may be unaware that the serving beam of the base station 110 is blocked. Instead, the UE 120 may rely on the stored measurements to switch to a different serving beam of the UE 120 (and continue to communicate using the blocked serving beam of the base station 110), as described above. The continued use of the blocked serving beam of the base station 110 may result in communication errors, such as dropped communications, failed reception, failed demodulation, and/or failed decoding, among other examples by using the blocked serving beam of the base station 110. Additionally, when the UE 120 switches to the different serving beam of the UE 120, the UE 120 may transmit a measurement report (e.g., a Layer 1 measurement report) that indicates measurements of beams that are based at least in part on the stored measurement values (e.g., performed prior to the blockage of the serving beam of the base station 110). Therefore, the UE 120 may indicate incorrect or outdated measurement values, rather than indicate the poor measurement value due to the beam blockage. As a result, the base station 110 may be unaware that the serving beam of the base station 110 is blocked and may not switch to a different serving beam (e.g., a different transmit beam of the base station 110).

Further, the UE 120 may continue to report measurement values (e.g., in a Layer 1 measurement report) for multiple beams using the stored values associated with multiple beams that may be stale or outdated (e.g., that may be based on measurements performed prior to a blockage or signal strength degradation, as described above). In some cases, multiple beams associated with the base station 110 become blocked or otherwise experience signal strength degradation. Therefore, even if the base station 110 becomes aware that the signal strength of the serving beam has decreased (e.g., due to the blockage), the base station 110 may switch the serving beam of the base station 110 to another beam that is also blocked (e.g., as the UE 120 transmitted a Layer 1 measurement report indicating stale or outdated values as described above).

Moreover, the UE 120 may use the stored values of the beams for reporting cell measurement reports (e.g., a Layer 3 cell measurement report) that may be stale or outdated (e.g., that may be based on measurements performed prior to a blockage or signal strength degradation, as described above). As a result, if a serving cell becomes blocked, the UE 120 may continue to report the stale or outdated values stored by the UE 120 for the cell. Therefore, the base station 110 associated with the serving cell may be unaware that the serving cell is blocked and may not initiate a handover to a different cell. As a result, the UE 120 may experience communication errors, such as dropped communications, failed reception, failed demodulation, and/or failed decoding, among other examples.

Some techniques and apparatuses described herein enable improved beam management by a UE 120. The UE 120 may measure signals transmitted by a base station 110 (e.g., SSBs) using a set of candidate beams. For an SSB, the UE 120 may identify a serving beam, from the set of candidate beams, based at least in part on the measurements. The UE 120 may identify a serving beam, from the set of candidate beams, for each beam (e.g., each SSB index) associated with the base station 110 in a similar manner. The UE 120 may monitor the serving beam(s) periodically to ensure that the measurement values of the serving beams(s) do not become outdated (e.g., the UE 120 may measure the serving beam(s) in accordance with a periodic schedule).

If the UE 120 determines that a serving beam of the UE 120 should be switched (e.g., due to signal strength degradation of the serving beam), then the UE 120 may identify one or more beams to replace the serving beam (e.g., the UE 120 may identify one or more beams that have better beam parameter values than the current serving beam based on stored values). The UE 120 may measure the one or more beams to confirm that at least one beam satisfies a beam switch condition (e.g., to confirm that the at least one beam has a better signal strength than the current serving beam with a power hysteresis). If the measurement of the one or more beams confirms that the beam switch condition is satisfied for at least one beam, then the UE 120 may switch the serving beam to a second beam (e.g., the at least one beam included in the one or more beams). If the measurement of the one or more candidate beams does not confirm that the beam switch condition is satisfied for at least one beam, then the UE 120 may not switch the serving beam.

As a result, the UE 120 ensures that serving beams are selected based on current or recent measurements performed by the UE 120. Moreover, the UE 120 ensures that if the serving beam experiences signal degradation that the serving beam is not switched to a different beam that is also experiencing similar signal degradation. Therefore, by using beam parameter values of the serving beam(s) to compile measurement reports to be transmitted to the base station 110, the UE 120 ensures that the base station 110 is enabled to make improved beam management or cell management decisions quickly when the UE 120 experiences signal degradation associated with a serving beam of the UE 120. As a result, communication errors, such as dropped communications, failed reception, failed demodulation, and/or failed decoding, among other examples, that would have otherwise been experienced by the UE 120 may be eliminated or reduced.

In some aspects, the UE 120 may transmit measurement reports to the base station 110 that are based at least in part on values of the beam parameter of the serving beam(s) of the UE 120. For example, the UE 120 may rank beams based at least in part on the beam parameter of the serving beam(s) and may transmit a Layer 1 beam measurement report indicating a set of best beams. The UE 120 may average the set of best beams for a cell and may transmit a Layer 3 cell measurement report to the base station 110.

Figure 7:
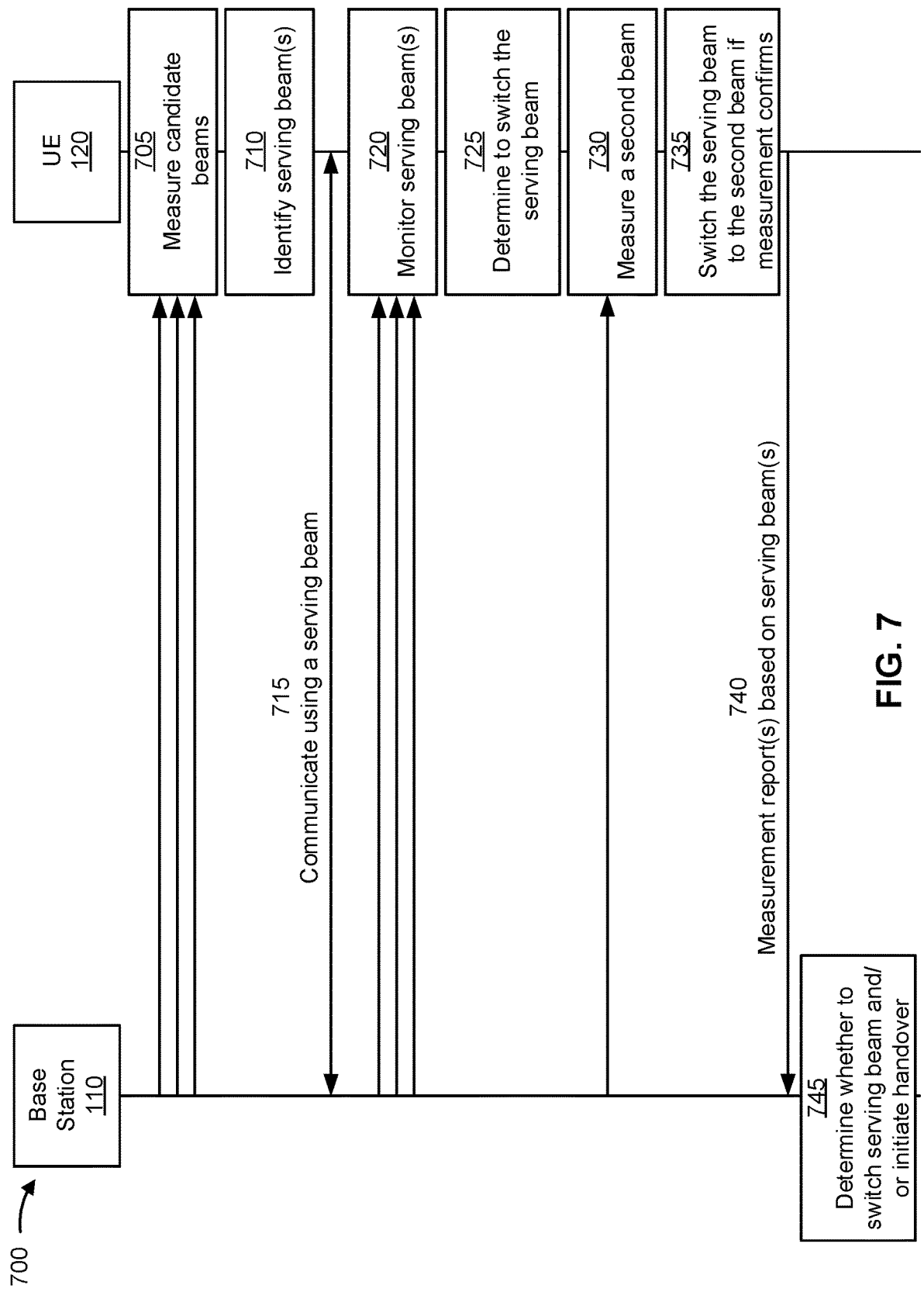
FIG. 7 is a diagram illustrating an example associated with beam management, in accordance with the present disclosure.

FIG. 7 is a diagram illustrating an example 700 associated with beam management, in accordance with the present disclosure. As shown in FIG. 7, a base station 110 and a UE 120 may communicate with one another in a wireless network, such as wireless network 100. The base station 110 and the UE 120 may communicate via a wireless access link, which may include an uplink and a downlink.

As shown by reference number 705, the UE 120 may measure a signal, transmitted by the base station 110, using a set of candidate beams. For example, the base station 110 may transmit an SSB to the UE 120. The UE 120 may measure the SSB using a set of candidate beams (e.g., a set of candidate receive beams) to determine a value of a beam parameter (e.g., RSRP, SNR, or RSRQ, among other examples) for each candidate beam included in the set of candidate beams. The UE 120 may perform similar measurements for each beam (e.g., each SSB index) associated with the base station 110. For example, as described above in connection with FIG. 4, an SSB may include an SSB index, which may correspond to a beam used to carry the SSB. The UE 120 may monitor for and/or measure SSBs using different receive beams. The UE 120 may determine and store beam parameter values of the different receive beams for each SSB index.

As shown by reference number 710, the UE 120 may identify a set of serving beams (e.g., one or more serving beams) for the UE 120 based at least in part on the measurements described above. For example, for an SSB index, the UE 120 may identify a candidate beam, from the set of candidate beams, with a best beam parameter value. The UE 120 may select the candidate beam with the best beam parameter value to be the serving beam associated with the SSB index. In some aspects, the UE 120 may identify a serving beam for each beam (e.g., each SSB index) associated with the base station 110 in a similar manner. In some aspects, the UE 120 may identify a subset of beams, from the set of candidate beams, with the best beam parameter values. The UE 120 may select the subset of beams with the best beam parameter values to be the serving beam(s) associated with the beam corresponding to the SSB index. In some aspects, the set of serving beams may be referred to as a set of virtual serving beams. In some aspects, the set of serving beams may include one or more receive beams of the UE 120 (e.g., in a similar manner as described above in connection with FIG. 5) and/or one or more transmit beams of the UE 120 (e.g., in a similar manner as described above in connection with FIG. 6).

The UE 120 may transmit one or more measurement reports to the base station 110 based at least in part on the measurements described above. For example, based at least in part on the monitoring and/or measuring of SSBs, the UE 120 may indicate one or more SSBs with a best beam parameter to the base station 110. The base station 110 and the UE 120 may use the one or more indicated SSBs to select one or more beams to be used for communication between the base station 110 and the UE 120. Additionally, or alternatively, the UE 120 may use the SSB and/or the SSB index to determine a cell timing for a cell via which the SSB is received (e.g., a serving cell).

As shown by reference number 715, the UE 120 and the base station 110 may communicate using a serving beam included in the set of serving beams. In some aspects, the serving beam may be a beam used by the UE 120 to transmit measurement report (e.g., Layer 1 measurement reports and/or Layer 3 measurement reports). For example, the base station 110, based at least in part on the reported measurements from the UE 120, may select a beam or beam pair for communications between the UE 120 and the base station 110. For example, the base station 110 may indicate or activate a TCI state for communications between the UE 120 and the base station 110. The TCI state may have a quasi co-location (QCL) relationship with an SSB transmitted by the base station 110 (e.g., the SSB that is associated with a serving beam included in the set of serving beams that has the best beam parameter value). In some aspects, the UE 120 may receive one or more communications from the base station 110 using the serving beam (e.g., in the downlink). In some aspects, the UE 120 may transmit one or more communications to the base station 110 using the serving beam (e.g., in the uplink).

As shown by reference number 720, the UE 120 may monitor the set of serving beams. For example, the UE 120 may periodically measure each serving beam included in the set of serving beams. In some aspects, the UE 120 may periodically measure each beam associated with the base station 110 (e.g., each SSB index) using a corresponding serving beam from the set of serving beams. In some aspects, the UE 120 may measure a serving beam every 60 milliseconds, every 80 milliseconds, or every 100 milliseconds, among other examples. In some aspects, the period associated with measuring the set of serving beams may be less than a period associated with measuring and/or monitoring other beams associated with the UE 120. For example, the UE 120 may measure the set of serving beams more frequently than other beams associated with the UE 120. In this way, the UE 120 may prioritize the set of serving beams (e.g., the candidate beam, from the set of candidate beams, with the best beam parameter value for each SSB index) to ensure that measurements of the set of serving beams stored by the UE 120 are recent and accurate. Therefore, the UE 120 is enabled to make beam management decisions and/or report measurements to the base station 110 using the recent and accurate measurements of the set of serving beams.

As shown by reference number 725, the UE 120 may determine to switch a serving beam included in the set of serving beams. For example, the UE 120 may determine that the serving beam is experiencing signal strength degradation. In some aspects, the UE 120 may determine that a value of a beam parameter of a second beam (e.g., that is stored by the UE 120 and based at least in part on a previously performed measurement, such as a measurement described above in connection with reference number 705) satisfies a beam switch condition. For example, the beam switch condition may be that the value of the beam parameter of the second beam exceeds the value of the beam parameter of the serving beam by a threshold amount. In some aspects, the UE 120 may determine to switch the serving beam based at least in part on determining that the value of the beam parameter of the serving beam does not satisfy a threshold.

As shown by reference number 730, the UE 120 may measure one or more beams based at least in part on determining to switch the serving beam. For example, the UE 120 may measure an SSB (that includes an SSB index that is associated with the serving beam) using the one or more beams. The UE 120 may determine a value of the beam parameter associated with the one or more beams based at least in part on measuring the SSB using the one or more beams. In some aspects, the UE 120 may measure the SSB using the second beam based at least in part on determining that the second beam satisfies the beam switch condition, as described above.

As shown by reference number 735, the UE 120 may switch the serving beam to a different beam (e.g., the second beam or a beam included in the one or more beams described above) if the measurement(s) (described above in connection with reference number 730) confirm that a beam switch condition is satisfied. If the measurement(s) (described above in connection with reference number 730) do not confirm that the beam switch condition is satisfied, then the UE 120 may not switch or update the serving beam. For example, as described above, the UE 120 may initially determine that the second beam satisfies the beam switch condition based at least in part on a stored value of a beam parameter of the second beam. The UE 120 may measure an SSB (or other reference signal) using the second beam to determine a new or updated value of the beam parameter of the second beam. If the new or updated value of the beam parameter of the second beam still satisfies the beam switch condition, then the UE 120 may switch the serving beam to the second beam. If the new or updated value of the beam parameter of the second beam no longer satisfies the beam switch condition, then the UE 120 may not switch the serving beam to the second beam.

The UE 120 may determine to switch and/or update each serving beam included in the set of serving beams in a similar manner as described above. In this way, the UE 120 may ensure that beam switch decisions associated with the serving beam are based at least in part on recent and accurate measurement values. Using the recent and accurate measurement values ensures that the UE 120 will not switch the serving beam to a different beam that is experiencing similar signal strength degradation as the serving beam (e.g., due to a beam blockage).

As shown by reference number 740, the UE 120 may transmit one or more measurement reports to the base station 110 that are based at least in part on measurement values (e.g., values of a beam parameter) of the set of serving beams. For example, the UE 120 may transmit a Layer 1 beam measurement report. The UE 120 may rank the set of serving beams based at least in part on the measurement values of the set of serving beams. The UE 120 may select one or more best serving beams (e.g., T best serving beams, where a value of T is defined, or otherwise fixed, by a wireless communication standard, such as a 3GPP Specification) based at least in part on ranking the set of serving beams (e.g., with Layer 1 filtering). The UE 120 may transmit the Layer 1 beam measurement report indicating the measurement values of the one or more best serving beams. The UE 120 may determine and/or compile the Layer 1 beam measurement report in compliance with a wireless communication standard, such as a 3GPP Specification.

As described above, the UE 120 may not switch or update a serving beam unless a subsequent measurement confirms that the serving beam should be switched and/or updated. Therefore, the Layer 1 beam measurement report transmitted to the base station 110 will indicate current and accurate measurement values of the set of serving beams. For example, the UE 120 will not switch a serving beam to a different beam using a stale or outdated measurement value of the different beam and then transmit the Layer 1 beam measurement report indicating the stale or outdated measurement value of the different beam. As a result, the base station 110 may quickly identify degradations in signal strength and/or beam blockages and may make improved beam management decisions, as described in more detail below.

In some aspects, the UE 120 may transmit a Layer 3 cell measurement report to the base station 110. For example, the UE 120 may identify the measurement values of the one or more best serving beams in a cell (e.g., P best serving beams in a cell, where a value of P is defined, or otherwise fixed, by a wireless communication standard, such as a 3GPP Specification. The value of P may be the same as, or different than, the value of T described above) based at least in part on ranking the set of serving beams in a similar manner as described above. The UE 120 may determine an average value of the beam parameter for the one or more best serving beams in the cell (e.g., with Layer 3 filtering). For example, the UE 120 may average the values of the beam parameter of the one or mor best serving beams in the cell. The UE 120 may transmit the Layer 3 cell measurement report indicating the average value of the one or more best serving beams in the cell. The UE 120 may determine and/or compile the Layer 3 cell measurement report in compliance with a wireless communication standard, such as a 3GPP Specification.

As described above, the UE 120 may not switch or update a serving beam unless a subsequent measurement confirms that the serving beam should be switched and/or updated. Therefore, the Layer 3 cell measurement report transmitted to the base station 110 will indicate current and accurate measurement values of the serving beams included in the cell. For example, the UE 120 will not switch a serving beam to a different beam using a stale or outdated measurement value of the different beam and then transmit the Layer 3 cell measurement report that is based at least in part on the stale or outdated measurement value of the different beam. As a result, the base station 110 may quickly identify degradations in signal strength and/or beam blockages in the cell and may make improved cell management decisions, as described in more detail below.

As shown by reference number 745, the base station 110 may determine whether to switch a serving beam or active TCI state associated with communications between the UE 120 and the base station 110 and/or whether to initiate a cell handover based at least in part on the measurement reports transmitted by the UE 120. For example, the base station 110 may determine whether to switch a serving beam or active TCI state associated with communications between the UE 120 and the base station 110 based at least in part on the Layer 1 beam measurement report transmitted by the UE 120. As the UE 120 may not switch a serving beam associated with the UE 120 unless a subsequent measurement confirms that the serving beam should be switched, if a beam associated with the active TCI state becomes blocked, then the Layer 1 beam measurement report will indicate a poor value of the beam parameter for the beam. As a result, the base station 110 may quickly identify that beam associated with the active TCI state is associated with a poor beam parameter value and/or that the beam is blocked. Moreover, as the UE 120 may maintain and/or switch serving beams for each beam (e.g., each SSB index) associated with the base station 110 in a similar manner, if any other beams associated with the base station 110 (e.g., associated with different SSB indexes) become blocked (or otherwise experience signal strength degradation), then the Layer 1 beam measurement report will indicate poor values of the beam parameter for the other beams that are blocked. Therefore, the base station 110 may be enabled to quickly identify the best beams and may make improved beam management decisions.

For example, the base station 110 may quickly identify that beam (or active TCI state) being using for communications between the UE 120 and the base station 110 (e.g., associated with an active TCI state) has become blocked and/or is otherwise experiencing signal strength degradation based at least in part on the Layer 1 beam measurement report. The base station 110 may identify other beams (e.g., associated with other TCI states) that have also become blocked and/or are otherwise experiencing similar signal strength degradation based at least in part on the Layer 1 beam measurement report. Therefore, the base station 110 may quickly identify that an active beam (or active TCI state) for communications between the UE 120 and the base station 110 should be switched. Moreover, the base station 110 may quickly identify other beams (or other TCI states) that are experiencing similar blockages and/or similar signal strength degradations. Therefore, the base station 110 may be enabled to quickly switch or update the active beam (or active TCI state) for communications between the UE 120 and the base station 110.

Additionally, the base station 110 may be enabled to avoid switching or updating the active beam (or active TCI state)

other beams (or other TCI states) that are experiencing similar blockages and/or similar signal strength degradations as the active beam. For example, the base station 110 may identify a new beam (or new TCI state) using the Layer 1 beam measurement report, as described above. The base station 110 may transmit an indication (e.g., using MAC-CE signaling, among other examples) of the new beam (or new TCI state). The base station 110 and the UE 120 may communicate using the new beam (or new TCI state). As a result, communication errors, such as dropped communications, failed reception, failed demodulation, and/or failed decoding, among other examples, that would have otherwise been experienced by the UE 120 if the active beam (or active TCI state) was not switched and/or if the active beam (or active TCI state) was switched to a beam (or TCI state) experiencing similar blockages and/or similar signal strength degradations as the active beam may be eliminated or reduced.

In some aspects, the base station 110 may determine whether to initiate a cell handover based at least in part on the Layer 3 cell measurement report transmitted by the UE 120. For example, if a cell associated with the base station 110 (e.g., a serving cell of the UE 120) become blocked or otherwise experience signal strength degradation, then the Layer 3 cell measurement report transmitted by the UE 120 may indicate a poor average value for the beam parameter associated with the cell. As the UE 120 may not update serving beams unless a subsequent measurement confirms that the serving beam should be switched, the Layer 3 cell measurement report transmitted by the UE 120 may quickly indicate if a serving cell of the UE 120 becomes blocked or otherwise experience signal strength degradation. Therefore, the base station 110 may quickly determine that a handover to a different cell should be initiated based at least in part on the Layer 3 cell measurement report transmitted by the UE 120.

The base station 110 may transmit a handover command (e.g., using RRC signaling, among other examples) to the UE 120. The base station 110 and/or the UE 120 may perform a handover procedure to switch or update the serving cell of the UE 120 to a new serving cell. As a result, when a serving cell of the UE 120 become blocked or otherwise experience signal strength degradation, the base station 110 may quickly identify that a handover to a new serving cell should be initiated. As a result, communication errors, such as dropped communications, failed reception, failed demodulation, and/or failed decoding, among other examples, that would have otherwise been experienced by the UE 120 if the serving cell was not switched or updated may be eliminated or reduced.

As indicated above, FIG. 7 is provided as an example. Other examples may differ from what is described with respect to FIG. 7.

Figure 8:
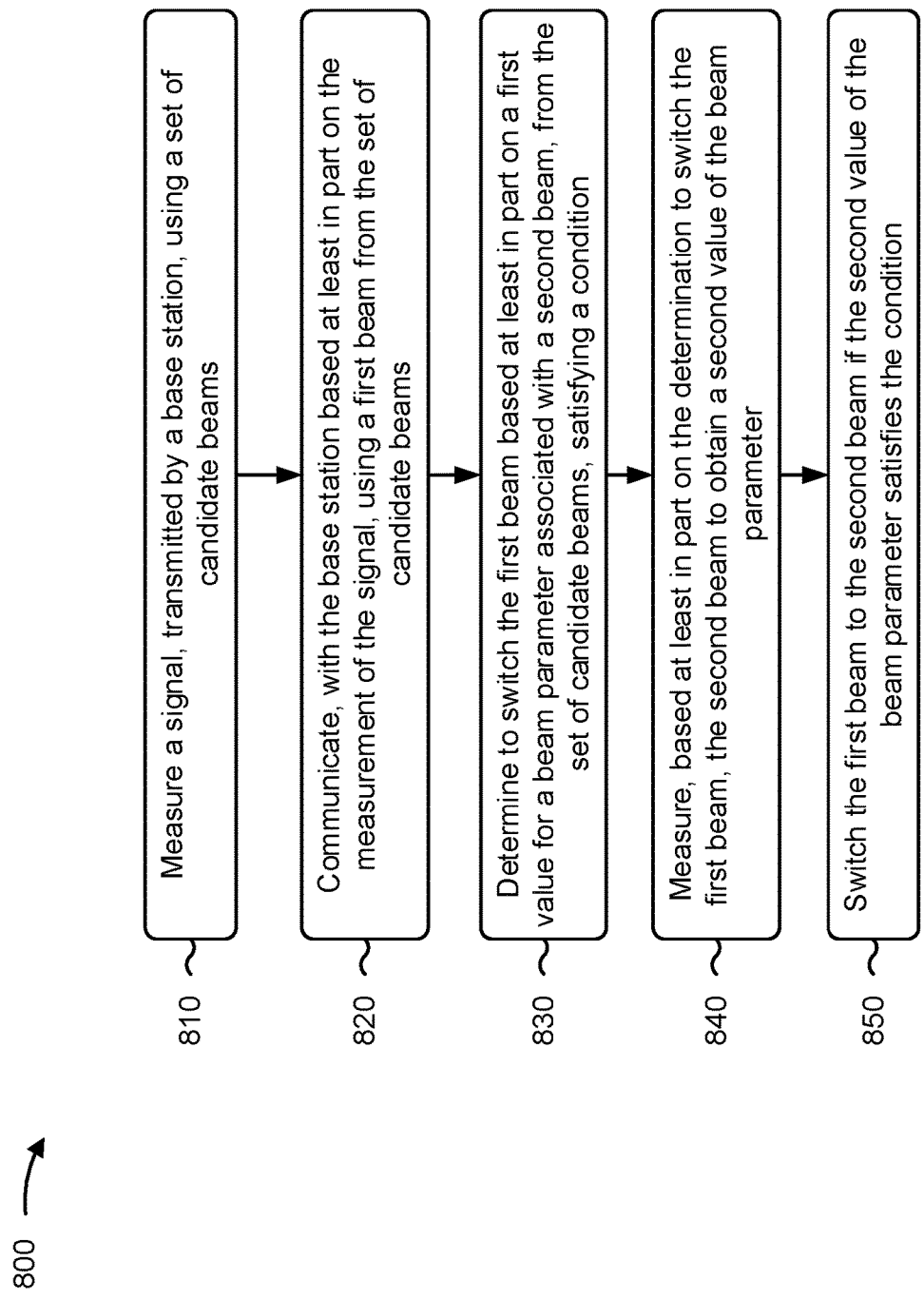
FIG. 8 is a diagram illustrating an example process associated with beam management, in accordance with the present disclosure.

FIG. 8 is a diagram illustrating an example process 800 performed, for example, by a UE, in accordance with the present disclosure. Example process 800 is an example where the UE (e.g., UE 120) performs operations associated with beam management.

As shown in FIG. 8, in some aspects, process 800 may include measuring a signal, transmitted by a base station, using a set of candidate beams (block 810). For example, the UE (e.g., using measurement component 908, depicted in FIG. 9) may measure a signal, transmitted by a base station, using a set of candidate beams, as described above. For example, in some aspects, the signal may be an SSB.

As further shown in FIG. 8, in some aspects, process 800 may include communicating, with the base station based at least in part on the measurement of the signal, using a first beam from the set of candidate beams (block 820). For example, the UE (e.g., using reception component 902 and/or transmission component 904, depicted in FIG. 9) may communicate, with the base station based at least in part on the measurement of the signal, using a first beam from the set of candidate beams, as described above. For example, in some aspects, the first beam may be a serving beam of the UE as described above in connection with FIG. 7.

As further shown in FIG. 8, in some aspects, process 800 may include determining to switch the first beam based at least in part on a first value for a beam parameter associated with a second beam, from the set of candidate beams, satisfying a condition (block 830). For example, the UE (e.g., using determination component 910, depicted in FIG. 9) may determine to switch the first beam based at least in part on a first value for a beam parameter associated with a second beam, from the set of candidate beams, satisfying a condition, as described above.

As further shown in FIG. 8, in some aspects, process 800 may include measuring, based at least in part on the determination to switch the first beam, the second beam to obtain a second value of the beam parameter (block 840). For example, the UE (e.g., using measurement component 908, depicted in FIG. 9) may measure, based at least in part on the determination to switch the first beam, the second beam to obtain a second value of the beam parameter, as described above.

As further shown in FIG. 8, in some aspects, process 800 may include switching the first beam to the second beam if the second value of the beam parameter satisfies the condition (block 850). For example, the UE (e.g., using beam switching component 912, depicted in FIG. 9) may switch the first beam to the second beam if the second value of the beam parameter satisfies the condition, as described above.

Process 800 may include additional aspects, such as any single aspect or any combination of aspects described below and/or in connection with one or more other processes described elsewhere herein.

In a first aspect, process 800 includes measuring the first beam in accordance with a periodic schedule.

In a second aspect, alone or in combination with the first aspect, process 800 includes determining a value of the beam parameter for each candidate beam included in the set of candidate beams based at least in part on the measurement of the signal using the set of candidate beams, and selecting, from the set of candidate beams, the first beam based at least in part on the value of the beam parameter for each candidate beam included in the set of candidate beams.

In a third aspect, alone or in combination with one or more of the first and second aspects, determining to switch the first beam includes determining that the condition is satisfied for switching the first beam to the second beam based at least in part on the first value and a value of the beam parameter associated with the first beam, wherein the first value and the value are obtained based at least in part on the measurement of the signal.

In a fourth aspect, alone or in combination with the third aspect, switching the first beam to the second beam if the second value of the beam parameter satisfies the condition includes determining, based at least in part on the measurement of the second beam, that the condition remains satisfied, and switching the first beam to the second beam based at least in part on the determination that the condition remains satisfied.

In a fifth aspect, alone or in combination with the third aspect, process 800 includes determining, based at least in part on the second value, that the condition is not satisfied, and refraining from switching the first beam to the second beam based at least in part on the determination that the condition is not satisfied.

In a sixth aspect, alone or in combination with one or more of the third through fifth aspects, the first value is a stored value of the beam parameter for the second beam, and determining that the condition is satisfied for switching the first beam to the second beam includes determining, based at least in part on a comparison of the stored value of the beam parameter for the second beam to a value of the beam parameter for the first beam, that the condition is satisfied.

In a seventh aspect, alone or in combination with one or more of the first through sixth aspects, process 800 includes transmitting a measurement report that is based at least in part on values of the beam parameter for one or more serving beams associated with the UE, where the first beam is included in the one or more serving beams.

In an eighth aspect, alone or in combination with the seventh aspect, process 800 includes ranking, based at least in part on values of the beam parameter for the one or more serving beams, the one or more serving beams, and selecting, based at least in part on the ranking of the one or more serving beams, a set of serving beams to be included in the measurement report, where transmitting the measurement report includes transmitting the measurement report indicating values of the beam parameter for the set of serving beams.

In a ninth aspect, alone or in combination with the eighth aspect, the measurement report is a Layer 1 beam measurement report.

In a tenth aspect, alone or in combination with the seventh aspect, process 800 includes ranking, based at least in part on values of the beam parameter for one or more serving beams, the one or more serving beams, selecting, based at least in part on the ranking of the one or more serving beams, a set of serving beams associated with a cell, and determining an average value of the beam parameter for the cell based at least in part on values of the beam parameter for the set of serving beams associated with the cell, where transmitting the measurement report includes transmitting the measurement report indicating the average value of the beam parameter for the cell.

In an eleventh aspect, alone or in combination with the tenth aspect, the measurement report is a Layer 3 cell measurement report.

In a twelfth aspect, alone or in combination with one or more of the first through eleventh aspects, process 800 includes receiving, from the base station, an indication to switch a serving transmit beam associated with the base station to a different transmit beam based at least in part on transmitting a measurement report, and switching, for the base station, the serving transmit beam associated with the base station to the different transmit beam.

In a thirteenth aspect, alone or in combination with one or more of the first through twelfth aspects, process 800 includes receiving, from the base station, a handover command indicating that the UE is to switch a serving cell of the UE to a different cell based at least in part on transmitting a measurement report, and performing a handover from the serving cell to the different cell based at least in part on receiving the handover command.

In a fourteenth aspect, alone or in combination with one or more of the first through thirteenth aspects, the beam parameter is a reference signal received power parameter.

In a fifteenth aspect, alone or in combination with one or more of the first through fourteenth aspects, the beam parameter is a signal to noise ratio parameter.

In a sixteenth aspect, alone or in combination with one or more of the first through fifteenth aspects, the beam parameter is a maximum transmit power parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
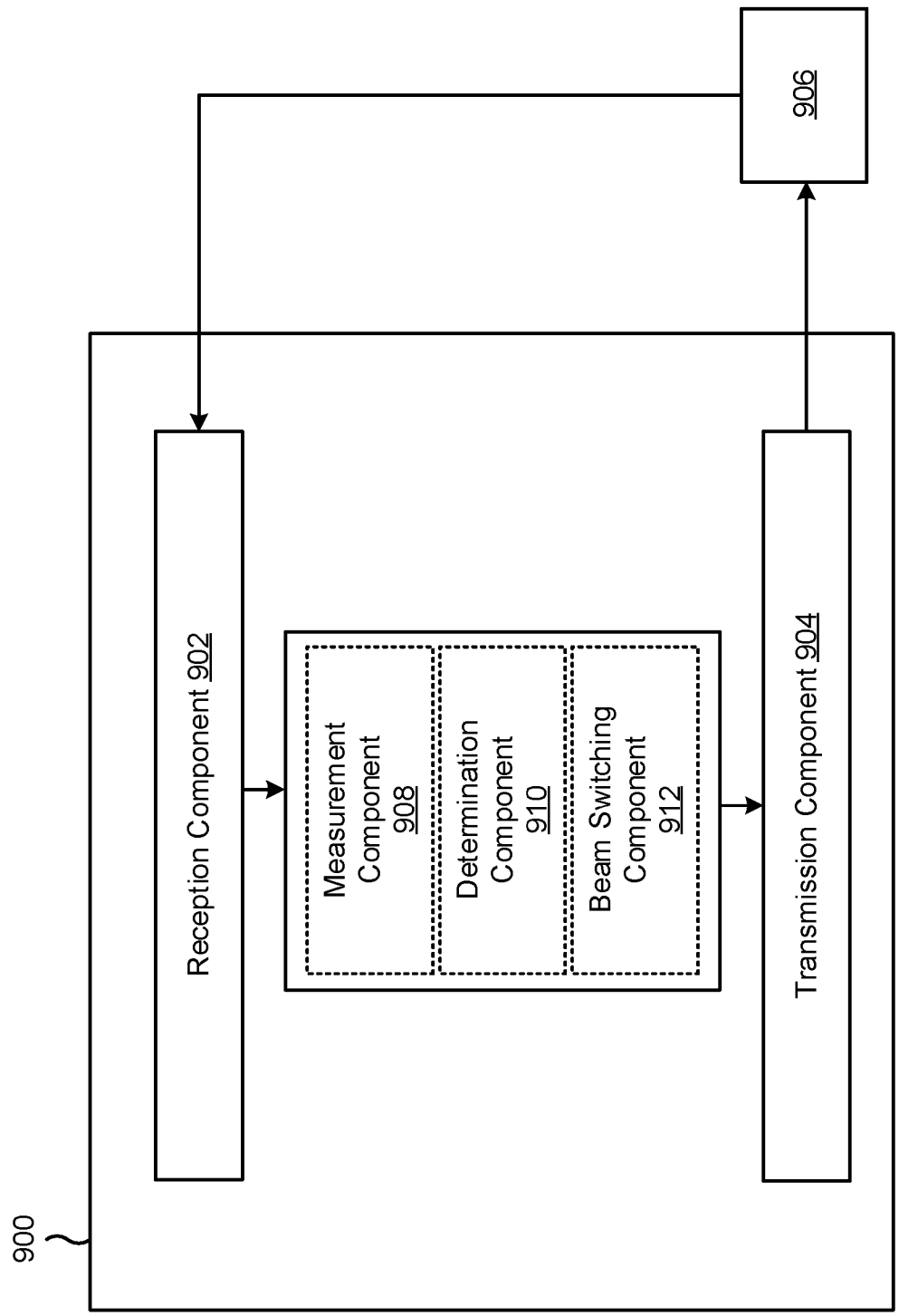
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a measurement component 908, a determination component 910, or a beam switching component 912, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The measurement component 908 may measure a signal, transmitted by a base station, using a set of candidate beams. In some aspects, the measurement component 908 may include one or more antennas, a demodulator, a MIMO detector, a receive processor, a controller/processor, a memory, or a combination thereof, of the UE described above in connection with FIG. 2.

The reception component 902 and/or the transmission component 904 may communicate, with the base station based at least in part on the measurement of the signal, using a first beam from the set of candidate beams. In some aspects, the determination component 910 may include a controller/processor and/or a memory, or a combination thereof, of the UE described above in connection with FIG. 2. The determination component 910 may determine to switch the first beam based at least in part on a first value for a beam parameter associated with a second beam, from the set of candidate beams, satisfying a condition. The measurement component 908 may measure, based at least in part on the determination to switch the first beam, the second beam to obtain a second value of the beam parameter. The beam switching component 912 may switch the second value of the beam parameter satisfies the condition. In some aspects, the beam switching component 912 may include one or more antennas, a demodulator, a MIMO detector, a receive processor, a controller/processor, a memory, or a combination thereof, of the UE described above in connection with FIG. 2.

The measurement component 908 may measure the first beam in accordance with a periodic schedule.

The determination component 910 may determine a value of the beam parameter for each candidate beam included in the set of candidate beams based at least in part on the measurement of the signal using the set of candidate beams.

The determination component 910 may select, from the set of candidate beams, the first beam based at least in part on the value of the beam parameter for each candidate beam included in the set of candidate beams.

The determination component 910 may determine that the condition is satisfied for switching the first beam to the second beam.

The determination component 910 may determine, based at least in part on the measurement of the second beam, that the condition remains satisfied. The beam switching component 912 may switch the first beam to the second beam based at least in part on the determination that the condition remains satisfied.

The determination component 910 may determine, based at least in part on the measurement of the second beam, that the condition is no longer satisfied. The beam switching component 912 may refrain from switching the first beam to the second beam based at least in part on the determination that the condition is no longer satisfied.

The transmission component 904 may transmit a measurement report that is based at least in part on values of a beam parameter for one or more serving beams associated with the UE, where the first beam is included in the one or more serving beams.

The determination component 910 may rank, based at least in part on values of the beam parameter for the one or more serving beams, the one or more serving beams. The determination component 910 may select, based at least in part on the ranking of the one or more serving beams, a set of serving beams to be included in the measurement report.

The determination component 910 may rank, based at least in part on values of the beam parameter for one or more serving beams, the one or more serving beams. The determination component 910 may select, based at least in part on the ranking of the one or more serving beams, a set of serving beams associated with a cell. The determination component 910 may determine an average value of the beam parameter for the cell based at least in part on values of the beam parameter for the set of serving beams associated with the cell.

The reception component 902 may receive, from the base station, an indication to switch a serving transmit beam associated with the base station to a different transmit beam based at least in part on transmitting a measurement report. The determination component 910 may switch, for the base station, the serving transmit beam associated with the base station to the different transmit beam.

The reception component 902 may receive, from the base station, a handover command indicating that the UE is to switch a serving cell of the UE to a different cell based at least in part on transmitting a measurement report.

The determination component 910 may perform (or the determination component 910 may cause the reception component 902 and/or the transmission component 904 to perform) a handover from the serving cell to the different cell based at least in part on receiving the handover command.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
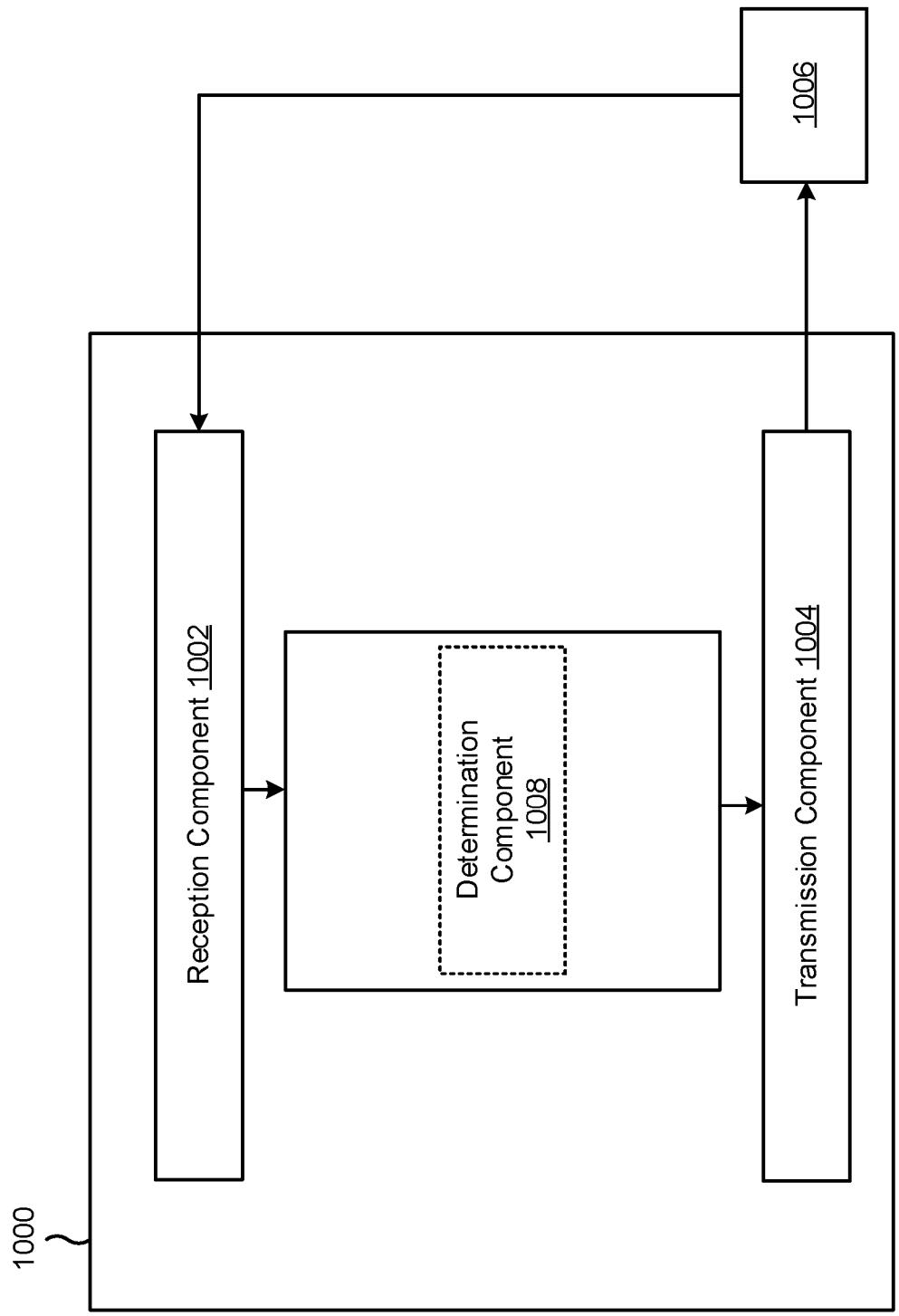

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 7. Additionally, or alternatively, the apparatus

1000 may be configured to perform one or more processes described herein or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit to a UE, a signal that is to be measured by the UE. The reception component 1002 may receive, from the UE, a measurement report. The determination component 1008 may determine a beam to be used for communications between the base station and the UE. In some aspects, the determination component 1008 may include a controller/processor and/or a memory, or a combination thereof, of the base station described above in connection with FIG. 2. The determination component 1008 may determine, based at least in part on the measurement report, that a beam that is being used for communications between the base station and the UE should be switched. The determination component 1008 may determine, based at least in part on the measurement report, a new beam for communication between the base station and the UE should be switched. The transmission component 1004 may transmit, to the UE, an indication to switch to the new beam. The determination component 1008 may determine, based at least in part on the measurement report, to initiate a cell handover. The determination component 1008 may determine, based at least in part on the measurement report, a new cell to be the serving cell for the UE. The transmission component 1004 may transmit, to the UE, an indication to perform a handover to the new cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a user equipment (UE), comprising: measuring a signal, transmitted by a base station, using a set of candidate beams; communicating, with the base station based at least in part on the measurement of the signal, using a first beam from the set of candidate beams; determining to switch the first beam; measuring, based at least in part on the determination to switch the first beam, a second beam from the set of candidate beams; and switching the first beam to the second beam if a beam parameter associated with the measurement of the second beam satisfies a condition.

Aspect 2: The method of aspect 1, further comprising: measuring the first beam in accordance with a periodic schedule.

Aspect 3: The method of any of aspects 1 through 2, further comprising: determining a value of the beam parameter for each candidate beam included in the set of candidate beams based at least in part on the measurement of the signal using the set of candidate beams; and selecting, from the set of candidate beams, the first beam based at least in part on the value of the beam parameter for each candidate beam included in the set of candidate beams.

Aspect 4: The method of any of aspects 1 through 3, wherein determining to switch the first beam comprises: determining that the condition is satisfied for switching the first beam to the second beam.

Aspect 5: The method of aspect 4, wherein switching the first beam to the second beam if the beam parameter associated with the measurement of the second beam satisfies the condition comprises: determining, based at least in part on the measurement of the second beam, that the condition remains satisfied; and switching the first beam to the second beam based at least in part on the determination that the condition remains satisfied.

Aspect 6: The method of aspect 4, further comprising: determining, based at least in part on the measurement of the second beam, that the condition is no longer satisfied; and refraining from switching the first beam to the second beam based at least in part on the determination that the condition is no longer satisfied.

Aspect 7: The method of any of aspects 4 through 6, wherein determining that the condition is satisfied for switching the first beam to the second beam comprises:

identifying a stored value of the beam parameter for the second beam; and determining, based at least in part on a comparison of the stored value of the beam parameter for the second beam to a value of the beam parameter for the first beam, that the condition is satisfied.

Aspect 8: The method of any of aspects 1 through 7, further comprising: transmitting a measurement report that is based at least in part on values of a beam parameter for one or more serving beams associated with the UE, wherein the first beam is included in the one or more serving beams.

Aspect 9: The method of aspect 8, further comprising: ranking, based at least in part on values of the beam parameter for the one or more serving beams, the one or more serving beams; and selecting, based at least in part on the ranking of the one or more serving beams, a set of serving beams to be included in the measurement report, wherein transmitting the measurement report comprises: transmitting the measurement report indicating values of the beam parameter for the set of serving beams.

Aspect 10: The method of aspect 9, wherein the measurement report is a Layer 1 beam measurement report.

Aspect 11: The method of aspect 8, further comprising: ranking, based at least in part on values of the beam parameter for one or more serving beams, the one or more serving beams; selecting, based at least in part on the ranking of the one or more serving beams, a set of serving beams associated with a cell; and determining an average value of the beam parameter for the cell based at least in part on values of the beam parameter for the set of serving beams associated with the cell, wherein transmitting the measurement report comprises: transmitting the measurement report indicating the average value of the beam parameter for the cell.

Aspect 12: The method of aspect 11, wherein the measurement report is a Layer 3 cell measurement report.

Aspect 13: The method of any of aspects 1 through 12, further comprising: receiving, from the base station, an indication to switch a serving transmit beam associated with the base station to a different transmit beam based at least in part on transmitting a measurement report; and switching, for the base station, the serving transmit beam associated with the base station to the different transmit beam.

Aspect 14: The method of any of aspects 1 through 13, further comprising: receiving, from the base station, a handover command indicating that the UE is to switch a serving cell of the UE to a different cell based at least in part on transmitting a measurement report; and performing a handover from the serving cell to the different cell based at least in part on receiving the handover command.

Aspect 15: The method of any of aspects 1 through 14, wherein the beam parameter is a reference signal received power parameter.

Aspect 16: The method of any of aspects 1 through 15, wherein the beam parameter is a signal to noise ratio parameter.

Aspect 17: The method of any of aspects 1 through 16, wherein the beam parameter is a maximum transmit power parameter.

Aspect 18: A method of wireless communication performed by a user equipment (UE), comprising: measuring a signal, transmitted by a base station, using a set of candidate beams; communicating, with the base station based at least in part on the measurement of the signal, using a first beam from the set of candidate beams; determining to switch the first beam based at least in part on a first value for a beam parameter associated with a second beam, from the set of candidate beams, satisfying a condition; measuring, based at least in part on the determination to switch the first beam, the second beam to obtain a second value of the beam parameter; and switching the first beam to the second beam if the second value of the beam parameter satisfies the condition.

Aspect 19: The method of Aspect 18, further comprising: measuring the first beam in accordance with a periodic schedule.

Aspect 20: The method of any of Aspects 18-19, further comprising: determining a value of the beam parameter for each candidate beam included in the set of candidate beams based at least in part on the measurement of the signal using the set of candidate beams; and selecting, from the set of candidate beams, the first beam based at least in part on the value of the beam parameter for each candidate beam included in the set of candidate beams.

Aspect 21: The method of any of Aspects 18-20, wherein determining to switch the first beam comprises: determining that the condition is satisfied for switching the first beam to the second beam based at least in part on the first value and a value of the beam parameter associated with the first beam, wherein the first value and the value are obtained based at least in part on the measurement of the signal.

Aspect 22: The method of Aspect 21, wherein switching the first beam to the second beam if the second value of the beam satisfies the condition comprises: determining, based at least in part on the measurement of the second beam, that the condition remains satisfied; and switching the first beam to the second beam based at least in part on the determination that the condition remains satisfied.

Aspect 23: The method of Aspect 21, further comprising: determining, based at least in part on the second value, that the condition is not satisfied; and refraining from switching the first beam to the second beam based at least in part on the determination that the condition is no longer satisfied.

Aspect 24: The method of any of Aspects 21-23, wherein the first value is a stored value of the beam parameter for the second beam, and wherein determining that the condition is satisfied for switching the first beam to the second beam comprises: determining, based at least in part on a comparison of the stored value of the beam parameter for the second beam to a value of the beam parameter for the first beam, that the condition is satisfied.

Aspect 25: The method of any of Aspects 18-24, further comprising: transmitting a measurement report that is based at least in part on values of the beam parameter for one or more serving beams associated with the UE, wherein the first beam is included in the one or more serving beams.

Aspect 26: The method of Aspect 25, wherein the first beam is used to transmit the measurement report.

Aspect 27: The method of any of Aspects 25-26, further comprising: ranking, based at least in part on values of the beam parameter for the one or more serving beams, the one or more serving beams; and selecting, based at least in part on the ranking of the one or more serving beams, a set of serving beams to be included in the measurement report, wherein transmitting the measurement report comprises: transmitting the measurement report indicating values of the beam parameter for the set of serving beams.

Aspect 28: The method of Aspect 27, wherein the measurement report is a Layer 1 beam measurement report.

Aspect 29: The method of any of Aspects 25-28, further comprising: ranking, based at least in part on values of the beam parameter for one or more serving beams, the one or more serving beams; selecting, based at least in part on the ranking of the one or more serving beams, a set of serving beams associated with a cell; and determining an average value of the beam parameter for the cell based at least in part on values of the beam parameter for the set of serving beams associated with the cell, wherein transmitting the measurement report comprises: transmitting the measurement report indicating the average value of the beam parameter for the cell.

Aspect 30: The method of Aspect 29, wherein the measurement report is a Layer 3 cell measurement report.

Aspect 31: The method of any of Aspects 18-30, further comprising: receiving, from the base station, an indication to switch a serving transmit beam associated with the base station to a different transmit beam based at least in part on transmitting a measurement report; and switching, for the base station, the serving transmit beam associated with the base station to the different transmit beam.

Aspect 32: The method of any of Aspects 18-31, further comprising: receiving, from the base station, a handover command indicating that the UE is to switch a serving cell of the UE to a different cell based at least in part on transmitting a measurement report; and performing a handover from the serving cell to the different cell based at least in part on receiving the handover command.

Aspect 33: The method of any of Aspects 18-32, wherein the beam parameter is a reference signal received power parameter.

Aspect 34: The method of any of Aspects 18-32, wherein the beam parameter is a signal to noise ratio parameter.

Aspect 35: The method of any of Aspects 18-32, wherein the beam parameter is a maximum transmit power parameter.

Aspect 36: An apparatus for wireless communication at a device, comprising a processor; memory coupled with the processor; and instructions stored in the memory and executable by the processor to cause the apparatus to perform the method of one or more of aspects 1-17 and 18-35.

Aspect 37: A device for wireless communication, comprising a memory and one or more processors coupled to the memory, the memory and the one or more processors configured to perform the method of one or more of aspects 1-17 and 18-35.

Aspect 38: An apparatus for wireless communication, comprising at least one means for performing the method of one or more of aspects 1-17 and 18-35.

Aspect 39: A non-transitory computer-readable medium storing code for wireless communication, the code comprising instructions executable by a processor to perform the method of one or more of aspects 1-17 and 18-35.

Aspect 40: A non-transitory computer-readable medium storing a set of instructions for wireless communication, the set of instructions comprising one or more instructions that, when executed by one or more processors of a device, cause the device to perform the method of one or more of aspects 1-17 and 18-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    measuring a signal, transmitted by a network entity, using a set of candidate beams to obtain a first value of a beam parameter for each candidate beam included in the set of candidate beams;
    communicating, with the network entity based at least in part on the measurement of the signal, using a first beam from the set of candidate beams;
    measuring the first beam to obtain a second value of the beam parameter associated with the first beam based at least in part on communicating with the network entity using the first beam;
    determining to switch the first beam based at least in part on the second value of the beam parameter associated with the first beam or the first value of the beam parameter associated with a second beam, from the set of candidate beams, satisfying a condition;

measuring, based at least in part on the determination to switch the first beam, the second beam to obtain a second value of the beam parameter associated with the second beam; and switching the first beam to the second beam if the second value of the beam parameter associated with the second beam satisfies the condition.

2. The method of claim 1, wherein measuring the first beam comprises:
measuring the first beam in accordance with a periodic schedule.

3. The method of claim 1, further comprising:
selecting, from the set of candidate beams, the first beam based at least in part on the first value of the beam parameter for each candidate beam included in the set of candidate beams.

4. The method of claim 1, wherein determining to switch the first beam comprises:
determining that the condition is satisfied for switching the first beam to the second beam based at least in part on the first value of the beam parameter associated with the second beam and the second value of the beam parameter associated with the first beam.

5. The method of claim 4, wherein switching the first beam to the second beam if the second value of the beam parameter associated with the second beam satisfies the condition comprises:
determining, based at least in part on the measurement of the second beam, that the condition remains satisfied; and
switching the first beam to the second beam based at least in part on the determination that the condition remains satisfied.

6. The method of claim 4, further comprising:
determining, based at least in part on the second value of the beam parameter associated with the second beam, that the condition is not satisfied; and
refraining from switching the first beam to the second beam based at least in part on the determination that the condition is no longer satisfied.

7. The method of claim 4, wherein the first value of the beam parameter associated with the second beam is a stored value, and wherein determining that the condition is satisfied for switching the first beam to the second beam comprises:
determining, based at least in part on a comparison of the stored value of the beam parameter for the second beam to the second value of the beam parameter associated with the first beam, that the condition is satisfied.

8. The method of claim 1, further comprising:
transmitting a measurement report that is based at least in part on values of the beam parameter for one or more serving beams associated with the UE, wherein the first beam is included in the one or more serving beams.

9. The method of claim 8, wherein the first beam is used to transmit the measurement report.

10. The method of claim 8, further comprising:
ranking, based at least in part on values of the beam parameter for the one or more serving beams, the one or more serving beams; and
selecting, based at least in part on the ranking of the one or more serving beams, a set of serving beams to be included in the measurement report,
wherein transmitting the measurement report comprises:
transmitting the measurement report indicating values of the beam parameter for the set of serving beams.

11. The method of claim 8, further comprising:
ranking, based at least in part on values of the beam parameter for one or more serving beams, the one or more serving beams;
selecting, based at least in part on the ranking of the one or more serving beams, a set of serving beams associated with a cell; and
determining an average value of the beam parameter for the cell based at least in part on values of the beam parameter for the set of serving beams associated with the cell,
wherein transmitting the measurement report comprises:
transmitting the measurement report indicating the average value of the beam parameter for the cell.

12. The method of claim 1, further comprising:
receiving, from the network entity, an indication to switch a serving transmit beam associated with the network entity to a different transmit beam based at least in part on transmitting a measurement report; and
switching, for the network entity, the serving transmit beam associated with the network entity to the different transmit beam.

13. The method of claim 1, further comprising:
receiving, from the network entity, a handover command indicating that the UE is to switch a serving cell of the UE to a different cell based at least in part on transmitting a measurement report; and
performing a handover from the serving cell to the different cell based at least in part on receiving the handover command.

14. The method of claim 1, wherein the beam parameter is a reference signal received power parameter, a signal-to-noise ratio parameter, or a maximum transmit power parameter.

15. A user equipment (UE) for wireless communication, comprising:
one or more memories; and
one or more processors, coupled to the one or more memories, configured to:
measure a signal, transmitted by a network entity, using a set of candidate beams to obtain a first value of a beam parameter for each candidate beam included in the set of candidate beams;
communicate, with the network entity based at least in part on the measurement of the signal, using a first beam from the set of candidate beams;
measure the first beam to obtain a second value of the beam parameter associated with the first beam based at least in part on communicating with the network entity using the first beam;
determine to switch the first beam based at least in part on the second value of the beam parameter associated with the first beam or the first value of the beam parameter associated with a second beam, from the set of candidate beams, satisfying a condition;
measure, based at least in part on the determination to switch the first beam, the second beam to obtain a second value of the beam parameter associated with the second beam; and
switch the first beam to the second beam if the second value of the beam parameter associated with the second beam satisfies the condition.

16. The UE of claim 15, wherein, to measure the first beam, the one or more processors are configured to:
measure the first beam in accordance with a periodic schedule.

17. The UE of claim 15, wherein the one or more processors are further configured to:

select, from the set of candidate beams, the first beam based at least in part on the first value of the beam parameter for each candidate beam included in the set of candidate beams.

18. The UE of claim 15, wherein the one or more processors, to determine to switch the first beam, are configured to:
   determine that the condition is satisfied for switching the first beam to the second beam based at least in part on the first value of the beam parameter associated with the second beam and the second value of the beam parameter associated with the first beam.

19. The UE of claim 18, wherein the one or more processors, to switch the first beam to the second beam if the second value of the beam parameter associated with the second beam satisfies the condition comprises, are configured to:
   determine, based at least in part on the measurement of the second beam, that the condition remains satisfied; and
   switch the first beam to the second beam based at least in part on the determination that the condition remains satisfied.

20. The UE of claim 18, wherein the one or more processors are further configured to:
   determine, based at least in part on the second value of the beam parameter associated with the second beam, that the condition is not satisfied; and
   refrain from switching the first beam to the second beam based at least in part on the determination that the condition is no longer satisfied.

21. The UE of claim 18, wherein the first value of the beam parameter associated with the second beam is a stored value, and wherein the one or more processors, to determine that the condition is satisfied for switching the first beam to the second beam, are configured to:
   determine, based at least in part on a comparison of the stored value of the beam parameter for the second beam to the second value of the beam parameter associated with the first beam, that the condition is satisfied.

22. The UE of claim 15, wherein the one or more processors are further configured to:
   transmit a measurement report that is based at least in part on values of the beam parameter for one or more serving beams associated with the UE, wherein the first beam is included in the one or more serving beams.

23. The UE of claim 22, wherein the first beam is used to transmit the measurement report.

24. The UE of claim 22, wherein the one or more processors are further configured to:
   rank, based at least in part on values of the beam parameter for the one or more serving beams, the one or more serving beams; and
   select, based at least in part on the ranking of the one or more serving beams, a set of serving beams to be included in the measurement report,
   wherein the one or more processors, to transmit the measurement report, are configured to:
      transmit the measurement report indicating values of the beam parameter for the set of serving beams.

25. The UE of claim 22, wherein the one or more processors are further configured to:
   rank, based at least in part on values of the beam parameter for one or more serving beams, the one or more serving beams;

select, based at least in part on the ranking of the one or more serving beams, a set of serving beams associated with a cell; and
   determine an average value of the beam parameter for the cell based at least in part on values of the beam parameter for the set of serving beams associated with the cell,
   wherein the one or more processors, to transmit the measurement report, are configured to:
      transmit the measurement report indicating the average value of the beam parameter for the cell.

26. The UE of claim 15, wherein the one or more processors are further configured to:
   receive, from the network entity, an indication to switch a serving transmit beam associated with the network entity to a different transmit beam based at least in part on transmitting a measurement report; and
   switch, for the network entity, the serving transmit beam associated with the network entity to the different transmit beam.

27. The UE of claim 15, wherein the one or more processors are further configured to:
   receive, from the network entity, a handover command indicating that the UE is to switch a serving cell of the UE to a different cell based at least in part on transmitting a measurement report; and
   perform a handover from the serving cell to the different cell based at least in part on receiving the handover command.

28. The UE of claim 15, wherein the beam parameter is a reference signal received power parameter, a signal-to-noise ratio parameter, or a maximum transmit power parameter.

29. A non-transitory computer-readable medium storing a set of instructions for wireless communication, the set of instructions comprising:
   one or more instructions that, when executed by one or more processors of a user equipment (UE), cause the UE to:
      measure a signal, transmitted by a network entity, using a set of candidate beams to obtain a first value of a beam parameter for each candidate beam included in the set of candidate beams;
      communicate, with the network entity based at least in part on the measurement of the signal, using a first beam from the set of candidate beams;
      measure the first beam to obtain a second value of the beam parameter associated with the first beam based at least in part on communicating with the network entity using the first beam;
      determine to switch the first beam based at least in part on the second value of the beam parameter associated with the first beam or the first value of the beam parameter associated with a second beam, from the set of candidate beams, satisfying a condition;
      measure, based at least in part on the determination to switch the first beam, the second beam to obtain a second value of the beam parameter associated with the second beam; and
      switch the first beam to the second beam if the second value of the beam parameter associated with the second beam satisfies the condition.

30. An apparatus for wireless communication, comprising:
   means for measuring a signal, transmitted by a network entity, using a set of candidate beams to obtain a first value of a beam parameter for each candidate beam included in the set of candidate beams;

means for communicating, with the network entity based at least in part on the measurement of the signal, using a first beam from the set of candidate beams;

means for measuring the first beam to obtain a second value of the beam parameter associated with the first beam based at least in part on communicating with the network entity using the first beam;

means for determining to switch the first beam based at least in part on the second value of the beam parameter associated with the first beam or the first value of the beam parameter associated with a second beam, from the set of candidate beams, satisfying a condition;

means for measuring, based at least in part on the determination to switch the first beam, the second beam to obtain a second value of the beam parameter associated with the second beam; and means for switching the first beam to the second beam if the second value of the beam parameter associated with the second beam satisfies the condition.

* * * * *